US012333908B2

(12) United States Patent
Meyer et al.

(10) Patent No.: US 12,333,908 B2
(45) Date of Patent: Jun. 17, 2025

(54) ELECTRONIC GAMING DEVICE AND SYSTEM WITH RANDOM MULTIPLE TRIGGER SYMBOL MECHANISMS FOR A SERIES OF GAME SEQUENCES

(71) Applicant: Aristocrat Technologies Australia Pty Limited, North Ryde (AU)

(72) Inventors: Jason Meyer, Wyoming (AU); Joseph Masci, Suwanee, GA (US)

(73) Assignee: Aristocrat Technologies Australia Pty Limited, North Ryde (AU)

(*) Notice: Subject to any disclaimer, the term of this patent is extended or adjusted under 35 U.S.C. 154(b) by 239 days.

(21) Appl. No.: 17/885,496

(22) Filed: Aug. 10, 2022

(65) Prior Publication Data

US 2023/0049641 A1 Feb. 16, 2023

(30) Foreign Application Priority Data

Aug. 11, 2021 (AU) ................................ 2021215193

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
CPC ... G07F 17/3213; G07F 17/3267; G07F 17/34
See application file for complete search history.

(56) References Cited

U.S. PATENT DOCUMENTS

| | | | | |
|---|---|---|---|---|
| 8,342,945 | B2 * | 1/2013 | Gomez | G07F 17/3244 463/19 |
| 9,275,523 | B1 * | 3/2016 | Hughes | G07F 17/3213 |
| 9,449,471 | B2 * | 9/2016 | Baerlocher | G07F 17/3267 |
| 2003/0045343 | A1 * | 3/2003 | Luccesi | G07F 17/32 463/20 |
| 2005/0159211 | A1 * | 7/2005 | Englman | G07F 17/3267 463/25 |
| 2005/0164774 | A1 * | 7/2005 | Gauselmann | G07F 17/3265 463/20 |
| 2006/0068881 | A1 * | 3/2006 | Casey | G07F 17/3265 463/20 |
| 2009/0176551 | A1 * | 7/2009 | Wilson | G07F 17/3267 463/20 |

(Continued)

*Primary Examiner* — Milap Shah
(74) *Attorney, Agent, or Firm* — Blank Rome LLP

(57) ABSTRACT

A gaming device comprises a display, a random number generator, a memory storing (i) a set of reel strips comprising a plurality of symbols including trigger symbols, and (ii) instructions which, when executed, cause the processor to select, for a first game instance, a plurality of symbols using the random number generator, control the display to display the plurality of symbols at a respective ones of a plurality of symbol positions, upon the displayed symbols of the first game instance comprising at least a threshold number of trigger symbols, initiate a feature game corresponding to the trigger symbols, the feature game comprising at least a second game instance, upon the displayed symbols of the first game instance comprising at least one trigger symbol and less than the threshold number of trigger symbols, randomly determine whether to initiate the feature game, conduct any initiated feature game, and make any award.

20 Claims, 42 Drawing Sheets

(56) References Cited

U.S. PATENT DOCUMENTS

| | | | | |
|---|---|---|---|---|
| 2009/0305770 | A1* | 12/2009 | Bennett | G07F 17/32 463/20 |
| 2016/0042608 | A1* | 2/2016 | Inamura | G07F 17/3255 463/16 |
| 2018/0122184 | A1* | 5/2018 | Wortmann | G07F 17/3213 |
| 2018/0268659 | A1* | 9/2018 | Chesworth | G07F 17/3267 |
| 2019/0102995 | A1* | 4/2019 | Meyer | G07F 17/34 |
| 2019/0188966 | A1* | 6/2019 | Chan | G07F 17/3267 |
| 2020/0273293 | A1* | 8/2020 | Sanborn | G07F 17/3267 |
| 2021/0065500 | A1* | 3/2021 | Boese | G07F 17/3213 |
| 2021/0065504 | A1* | 3/2021 | Delekta | G07F 17/34 |
| 2021/0097812 | A1* | 4/2021 | Malik | G07F 17/3225 |
| 2021/0256811 | A1* | 8/2021 | Ma | G07F 17/3213 |
| 2021/0304565 | A1* | 9/2021 | Marks | G07F 17/3244 |
| 2022/0051523 | A1* | 2/2022 | Chan | G06F 7/588 |
| 2024/0112541 | A1* | 4/2024 | Penacho | G07F 17/3213 |

* cited by examiner

300

| | 341 | 342 | 343 | 344 | 345 |
|---|---|---|---|---|---|
| | Reel Strip 1 | Reel Strip 2 | Reel Strip 3 | Reel Strip 4 | Reel Strip 5 |
| 301 | A | 10 | COR | COR | PIC1 |
| 302 | COR | J | COR | PIC2 | SCAT1 |
| 303 | PIC3 | Q | 9 | PIC3 | COR |
| 304 | PIC2 | Q | PIC2 | 9 | Q |
| 305 | K | A | PIC1 | Q | A |
| 301 | SCAT1 | SCAT2 | 10 | A | COR |
| 307 | COR | PIC1 | K | A | Q |
| 308 | A | J | WILD | 10 | WILD |
| 309 | J | Q | J | COR | K |
| 310 | COR | COR | COR | K | 9 |
| 311 | A | 9 | Q | PIC1 | SCAT1 |
| 312 | PIC3 | K | PIC3 | SCAT1 | 10 |
| 313 | 10 | 10 | SCAT2 | A | COR |
| 314 | SCAT2 | SCAT1 | Q | J | Q |
| 315 | K | WILD | Q | COR | A |
| 316 | PIC1 | J | 10 | A | COR |
| 317 | J | COR | A | SCAT2 | K |
| 318 | Q | A | SCAT2 | 9 | A |
| 319 | COR | PIC2 | COR | 9 | J |
| 320 | A | PIC3 | Q | PIC2 | COR |
| 321 | PIC1 | 9 | A | PIC1 | SCAT2 |
| 321 | A | COR | COR | WILD | 10 |
| 323 | J | SCAT1 | COR | COR | J |
| 324 | COR | COR | SCAT1 | Q | Q |
| 325 | PIC2 | Q | 9 | A | PIC3 |
| 330 | ... | ... | ... | ... | ... |

*FIG. 3*

FIG. 11
1100
GRAND
500,101,000
100,101,225
250,000
100,000
1170
15 WINS
GRAND JACKPOT
3 SPINS
REMAINING
6
COLLECTED
813
812
811
1063A
100K
TOTAL BET
10,000
0
SPIN
821
822
823
824
825

FIG. 13
1300
GRAND
500,101,000
100,101,225
250,000
100,000
1170A
WIN 245K WIN
813
812
811
10K
10K
5K
100K
10K
25K
25K
5K
5K
5K
25K
5K
10K
5K
TOTAL BET
10,000
TOTAL WIN
SPIN
821
822
823
824
825

FIG. 19
1900
GRAND
500,103,700
100,104,600
250,000
100,000
WIN 445K WIN
813
812
811
20K
50K
20K
20K
50K
50K
20K
20K
25K
25K
100K
20K
25K
TOTAL BET
10,000
TOTAL WIN
27,096
SPIN
821
822
823
824
825

FIG. 24
2400
2231
2241
2251
GRAND
400K
100K
FREE GAMES
MATCH THREE
HOLD N'SPIN
2462
2451
2452
2461
2452
2453
2454
15K
20K
TOTAL BET
10,000
TOTAL WIN
0
SPIN
MAX BET
821
822
823
824
825

FIG. 30
3000
2231A
2241A
2251A
2232A
GRAND
MINOR
400K
MINI
100K
FREE GAMES
MATCH THREE
HOLD N'SPIN
3041
3015
3014
3013
3012
3011
15K
10K
FREE GAME 4 OF 8
TOTAL BET
10,000
TOTAL WIN
12,301
SPIN
821
822
823
3001
824
825

FIG. 31
3100
GRAND
400K
100K
FREE GAMES
MATCH THREE
3181
3182
3183
3184
3185
3186
3015
3014
3013
3012
3011
15K
10K
200K
20K
10K
15K
FREE GAME 3 OF 8
TOTAL BET
10,000
TOTAL WIN
SPIN
821
822
823
824
825

FIG. 32
3200
GRAND
MINOR
400K
100K
SPINS
REMAINING
6
COLLECTED
3181
3182
3183
3184
3185
3186
3015
3014
3013
3012
3011
15K
10K
200K
20K
10K
15K
TOTAL BET
10,000
TOTAL WIN
45,500
SPIN
821
822
823
824
825

FIG. 33
3300
GRAND
400K
100K
WIN 485K WIN
3015
3014
3013
3012
3011
15K
10K
15K
10K
10K
10K
20K
15K
200K
20K
20K
10K
15K
15K
10K
15K
10K
15K
25K
TOTAL BET
10,000
TOTAL WIN
107,982
SPIN
821
822
823
824
825

FIG. 34
3400
GRAND
MAJOR
MINOR
400K
MINI
100K
FREE GAMES
MATCH THREE
HOLD N'SPIN
3581
3413
3583
3412
3584
3411
3582
3585
3586
25K
10K
20K
FREE GAME 2 OF 15
TOTAL BET
10,000
TOTAL WIN
89,200
SPIN
821
822
823
824
825

FIG. 35
3500
GRAND
400K
100K
3 SPINS REMAINING
6 COLLECTED
25K
10K
10K
20K
10K
25K
TOTAL BET
10,000
TOTAL WIN
89,200
SPIN
3581
3413
3583
3412
3584
3582
3585
3411
3586
821
822
823
824
825

FIG. 36
3600
GRAND
MINOR
400K
WIN 235K WIN
25K
10K
10K
10K
20K
10K
10K
25K
15K
TOTAL BET
10,000
TOTAL WIN
109,515
SPIN
3413
3412
3411
821
822
823
824
825

*FIG. 37*
3700
3731
3732
3741
3742
3751
3752
GRAND
$10,000.06
MAJOR
FREE GAMES
MATCH THREE
HOLD & SPIN
Grand Prosperity

FIG. 38
3800
3731
3733
3741
3743
3751
3753
GRAND
$10,000.06
MAJOR
$500.18
FREE GAMES
MATCH THREE
HOLD &SPIN
Grand Prosperity
TOUCH A DENOMINATION TO PLAY

FIG. 39
3900
3731
3741
3751
3742
3732
GRAND
$10,000.06
MAJOR
$500.18
TOUCH TO SWAP
TOUCH TO SWAP
TOUCH TO SWAP
FREE GAMES
MATCH THREE
HOLD & SPIN
813
812
811
821
822
823
824
825

ELECTRONIC GAMING DEVICE AND SYSTEM WITH RANDOM MULTIPLE TRIGGER SYMBOL MECHANISMS FOR A SERIES OF GAME SEQUENCES

RELATED APPLICATION(S)

The present application claims priority to Australia Patent Application No. 2021215193, filed Aug. 11, 2021, and entitled "Gaming Device with Multiple Trigger Mechanisms" which is hereby incorporated by reference in its entirety.

BACKGROUND

The present application relates to a gaming device, a method of operating a gaming device and a system with multiple trigger mechanisms.

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

Technical problems exist involving how a gaming device that may satisfy a designated game return-to-player that either complies with applicable regulations for certain game features or is set to achieve a certain game volatility, where the processor of the electronic gaming device initiates a series of game instances based upon reaching one or more of a threshold number of trigger symbols from a plurality of trigger symbols, where each different feature corresponds to a trigger symbol, and/or initiates a feature game, using a random number generator to randomly determine whether to initiate a feature game, when there is at least one trigger symbol and less than the threshold number of trigger symbols.

To meet or satisfy a target volatility criterion or designated RTP, the random nature of game determinations and whether to initiate a series of feature games based on the occurrence of a threshold number of trigger symbols associated with a respective feature game may drive a game device to over process and generate numerous game outcomes in the background before determining and displaying a game outcome to a player that satisfies the target volatility criterion or designated RTP for the designated jurisdiction. Repeated determination of whether each of the numerous game outcomes yields the designated volatility each time a series of game instances is triggered by an associated trigger symbol, and then played may be an inefficient, and time and resource consuming process. Additionally, the confined screen size of many gaming devices creates challenges as to how to effectively communicate to the viewer each different feature game that may be triggered by a corresponding, respective trigger symbol when a threshold is reached or triggered, using a random number generator, when below a threshold number of trigger symbols.

Further limitations and disadvantages of conventional and traditional approaches will become apparent to one of skill in the art, through comparison of such systems and devices with some aspects of the present disclosure as set forth in the remainder of the present application with reference to the drawings.

SUMMARY

There is disclosed a gaming device, a method of operating a gaming device and a system where one or more additional game instances can be triggered from a first game instance (e.g. a feature game triggered from a base game instance upon a threshold number of trigger symbols being selected. In example embodiments, an additional trigger mechanism is provided where one or more additional game instances can be triggered when at least one trigger symbol (but less than the threshold) is selected based on a random determination.

An example embodiment describes a gaming device comprising a display, a random number generator, a memory storing (i) a set of reel strips comprising a plurality of symbols including trigger symbols, and (ii) instructions which, when executed by the processor, cause the processor to select, for a first game instance, a plurality of symbols from the set of reel strips using the random number generator, control the display to display the plurality of plurality of symbols at a respective ones of a plurality of symbol positions, upon the displayed symbols of the first game instance comprising at least a threshold number of trigger symbols, initiate a feature game corresponding to the trigger symbols, the feature game comprising at least a second game instance, upon the displayed symbols of the first game instance comprising at least one trigger symbol and less than the threshold number of trigger symbols, use the random number generator to randomly determine whether to initiate the feature game, conduct any initiated feature game, and make any award resulting from the feature game.

Another example embodiment describes a method of operating a gaming device comprising a display, a random number generator, and memory storing a set of reel strips comprising a plurality of symbols including trigger symbols. The method comprises selecting, for a first game instance, a plurality of symbols from the set of reel strips using the random number generator, controlling the display to display the plurality of plurality of symbols at a respective ones of a plurality of symbol positions, upon the displayed symbols of the first game instance comprising at least a threshold number of trigger symbols, initiating a feature game corresponding to the trigger symbols, the feature game comprising at least a second game instance, upon the displayed symbols of the first game instance comprising at least one trigger symbol and less than the threshold number of trigger symbols, using the random number generator to randomly determine whether to initiate the feature game, conducting any initiated feature game, and making any award resulting from the feature game.

Another example embodiment describes a system comprising at least one display, a random number generator, one or more processors, and at least one memory storing (i) a set of reel strips comprising a plurality of symbols including trigger symbols, and (ii) instructions which, when executed by the one or more processors, cause the one or more processors to select, for a first game instance, a plurality of symbols from the set of reel strips using the random number generator, control the at least one display to display the plurality of plurality of symbols at a respective ones of a plurality of symbol positions, upon the displayed symbols of the first game instance comprising at least a threshold number of trigger symbols, initiate a feature game corresponding to the trigger symbols, the feature game comprising at least a second game instance, upon the displayed symbols of the first game instance comprising at least one trigger symbol and less than the threshold number of trigger symbols, use the random number generator to randomly determine whether to initiate the feature game, conduct any initiated feature game, and make any award resulting from the feature game.

BRIEF DESCRIPTION OF THE DRAWINGS

FIG. 3 illustrates an example reel strip layout.

DETAILED DESCRIPTION

Figure 1:
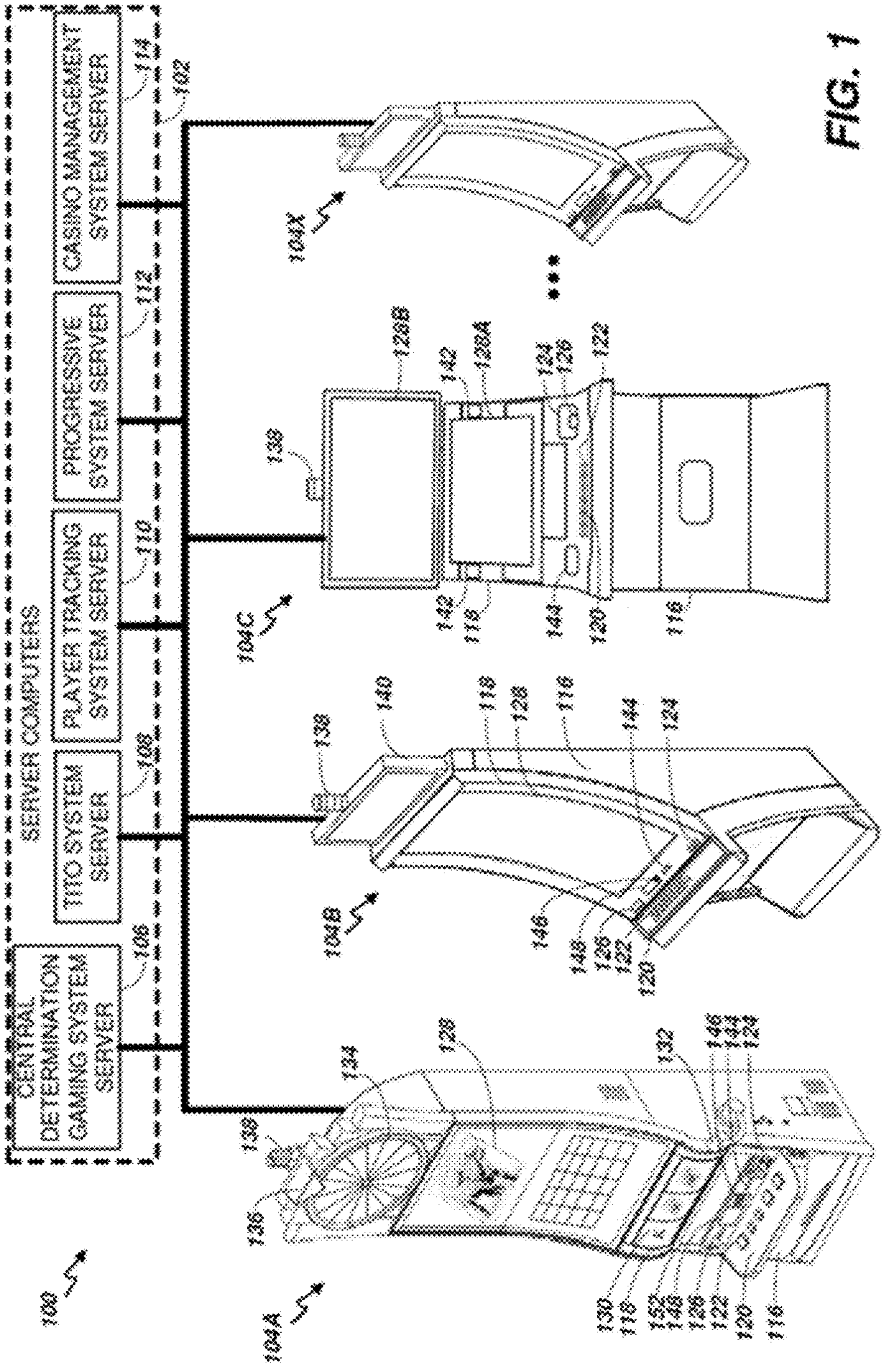
FIG. 1 is an exemplary diagram showing several EGMs networked with various gaming related servers.

In an implementation, a gaming device animates a plurality of different feature indicator icons dropping from a current state to a subsequent state along a plurality of different animated feature indicators, based on a number of trigger symbols displayed in an array of display positions to indicate how close one or more feature games are to be triggered. Specifically, when a trigger symbol displayed in the array, a sprite is animated shooting into a feature indicator icon corresponding to the trigger symbol, while the feature indicator icon moves from the current state to the subsequent state. When a particular feature indicator icon drops to a particular state, a lowest state, or a feature state, in one of the plurality of animated feature indicators, a feature game corresponding to the particular feature indicator icon is triggered. The plurality of feature games may include, hold and spin games, free games, match free games, feature that expands of the array and the array may be expanded to include more symbols, thus requiring an adjustment of how symbols are selected for display in the array to satisfy or maintain a game design, target RTP, target volatility, and/or jurisdictional requirements. In example embodiments, an additional trigger mechanism is provided where one or more additional game instances can be triggered when at least one trigger symbol (but less than the threshold) is selected based on a random determination.

Implementations of the present disclosure represent a technical improvement in the art of gaming technology. Specifically, the implementations illustrated address the technical problem of controlling volatilities to meet one or more target thresholds that may include a designated or target RTP, a target game outcome, a target game payout, a target game volatility, a target win liability, a target maximum win liability, and the like, in an electronic gaming device where the processor of the electronic gaming device initiates a series of game instances based upon reaching one or more of a threshold number of trigger symbols from a plurality of trigger symbols, where each different feature game corresponds to a trigger symbol with multiple positional states, and/or initiates a feature game, using a random number generator to randomly determine whether to initiate a feature game, when there is at least one trigger symbol and less than the threshold number of trigger symbols.

For example, gaming implementations with multiple game sequences, multiple trigger conditions, different feature games with some determined using a random number generator, may require generating multiple game outcomes for each of the multiple game sequences that can cause relatively higher latency and/or intensive data processing. Such configurations can also lead to higher than permitted return-to-player.

Implementations disclosed herein drive a game controller to generate game outcomes across multiple game sequences through mapping a plurality of symbols to reels that include feature game specific trigger symbols, where the processor controls those trigger symbols to indicate a state of progress toward a feature game and where those trigger symbols represent different feature games that may be triggered from the based game. This trigger feature is combined with a separate random number generation selection step in cases where a threshold number of trigger symbols states has not occurred but where at least one trigger symbol has occurred. This aspect of the trigger mechanism may be controlled, for example, by having the processor uses mechanism to map randomly generated outcomes to the rate or occurrence of trigger symbols such that it can be within parameters of the game (e.g. weighted tables). By combining these triggering mechanisms, the technique can control game volatility and/or maximum win liability for such a multi-game round configuration while expanding features playable from a base game and still maintaining and enhancing player engagement and understanding.

Further, the incorporation of visual indicators, sometimes animated, and changing feature trigger positions visually transforms the displayed feature indicators to communicate the progress toward initiation of one or more feature games through defined states of the trigger symbols. The visual indicators provide an improved electronic game machine display in a confined game display size or space such that the player may better appreciate how close the player is to launching a feature game. The visual indicators simplify otherwise complex game presentations to the player of separate feature game opportunities, help to avoid or reduce the need for understanding overly complicated calculations or repeated reference to game rules, and/or improve player engagement during the game rounds. The graphical user interface employing the illustrated implementations improves the usability of electronic gaming devices.

Thus, implementations of the present disclosure are not merely new game rules or simply new display patterns. Rather, the implementations provide technologic improvements to gaming technology in the art of electronic gaming devices and software for such electronic gaming devices, and enhance interactions between players and gaming devices or machines.

Moreover, the above example is not intended to be limiting, but merely exemplary of technologic improvements provided by some implementations of the present disclosure. Technological improvements of other implementations are readily apparent to those of ordinary skill in the art in light of the present disclosure.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a web site maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
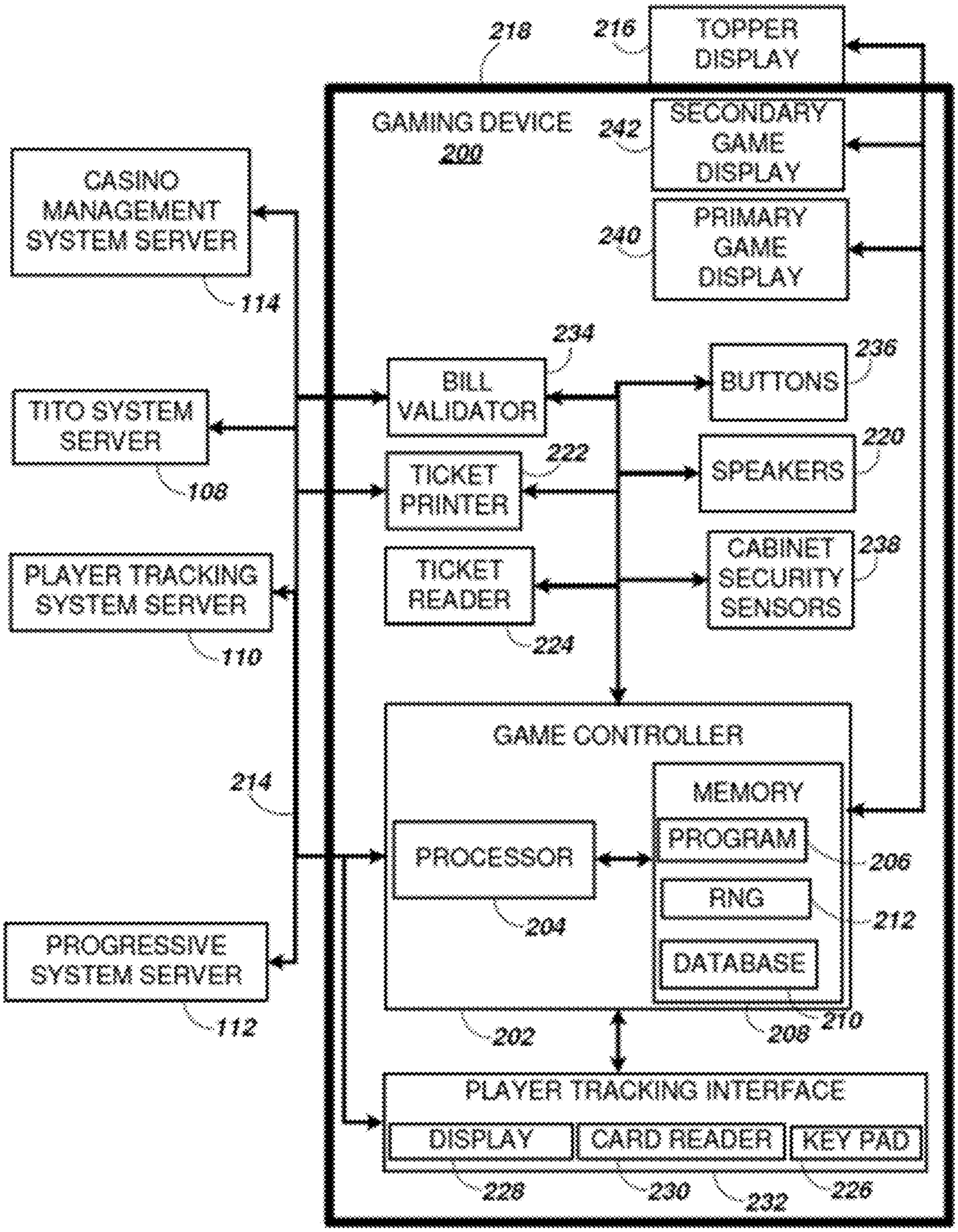
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a credit input mechanism such as a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The credit balance may be stored in a meter in memory 208 (or in a separate hardware meter). In some embodiment, memory 208 implements a credit meter to monitor to the credit balance and has a win meter that monitors any amounts won during any game instance(s) resulting from the wager. The balance of the win meter is transferred to the credit meter prior at the conclusion of the game instances. The player may also optionally insert a loyalty club card into the card reader 230. In some embodiments, the loyalty club card may also act as a credit input mechanism, by allowing a player to transfer funds from a centrally stored balance in order to establish a credit balance. During the game, the player views the game outcome on the game displays 240, 242. Other game and prize information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

Figure 5:
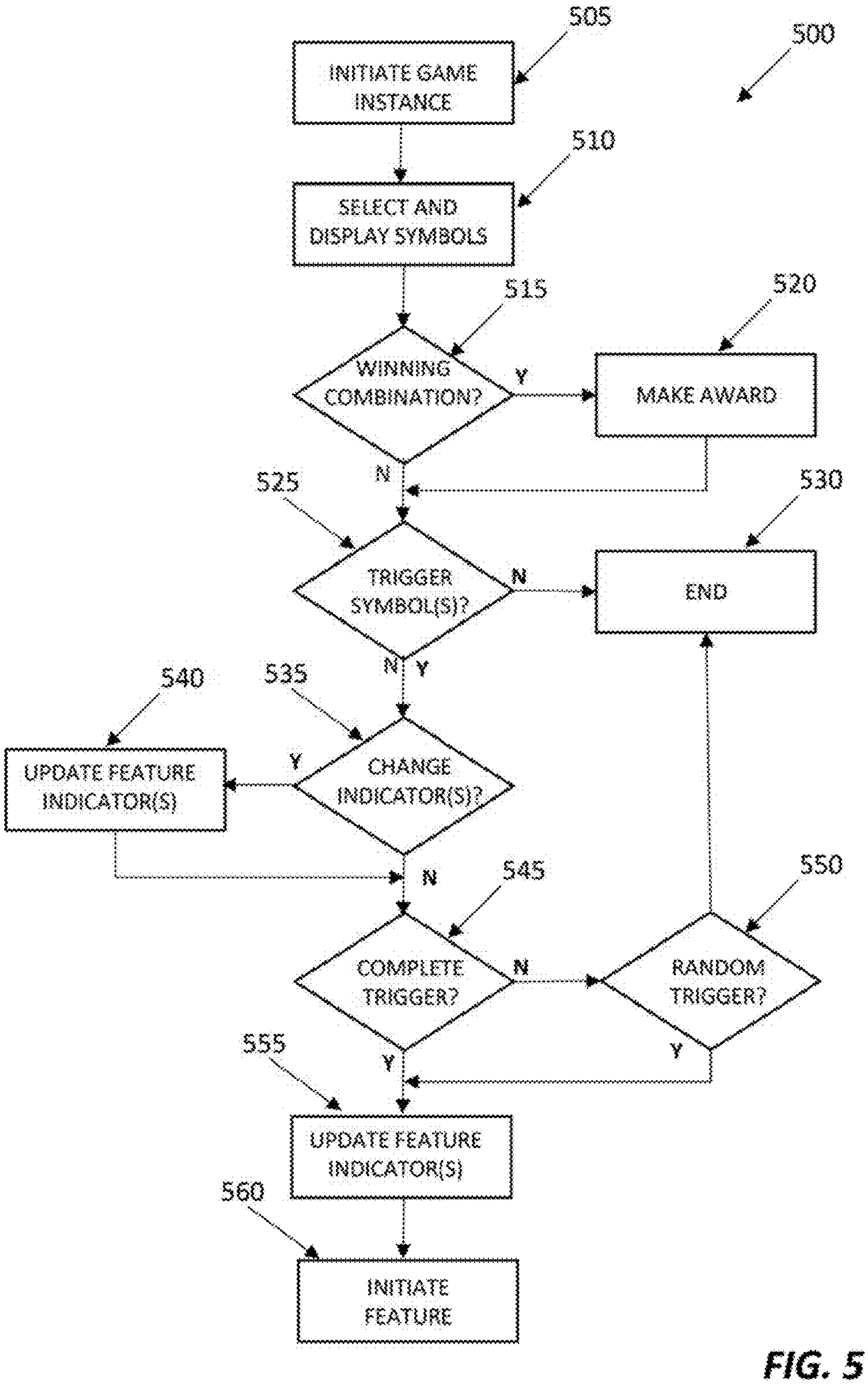
FIG. 5 is a flow chart of a method of operating a gaming device.
Figure 8:
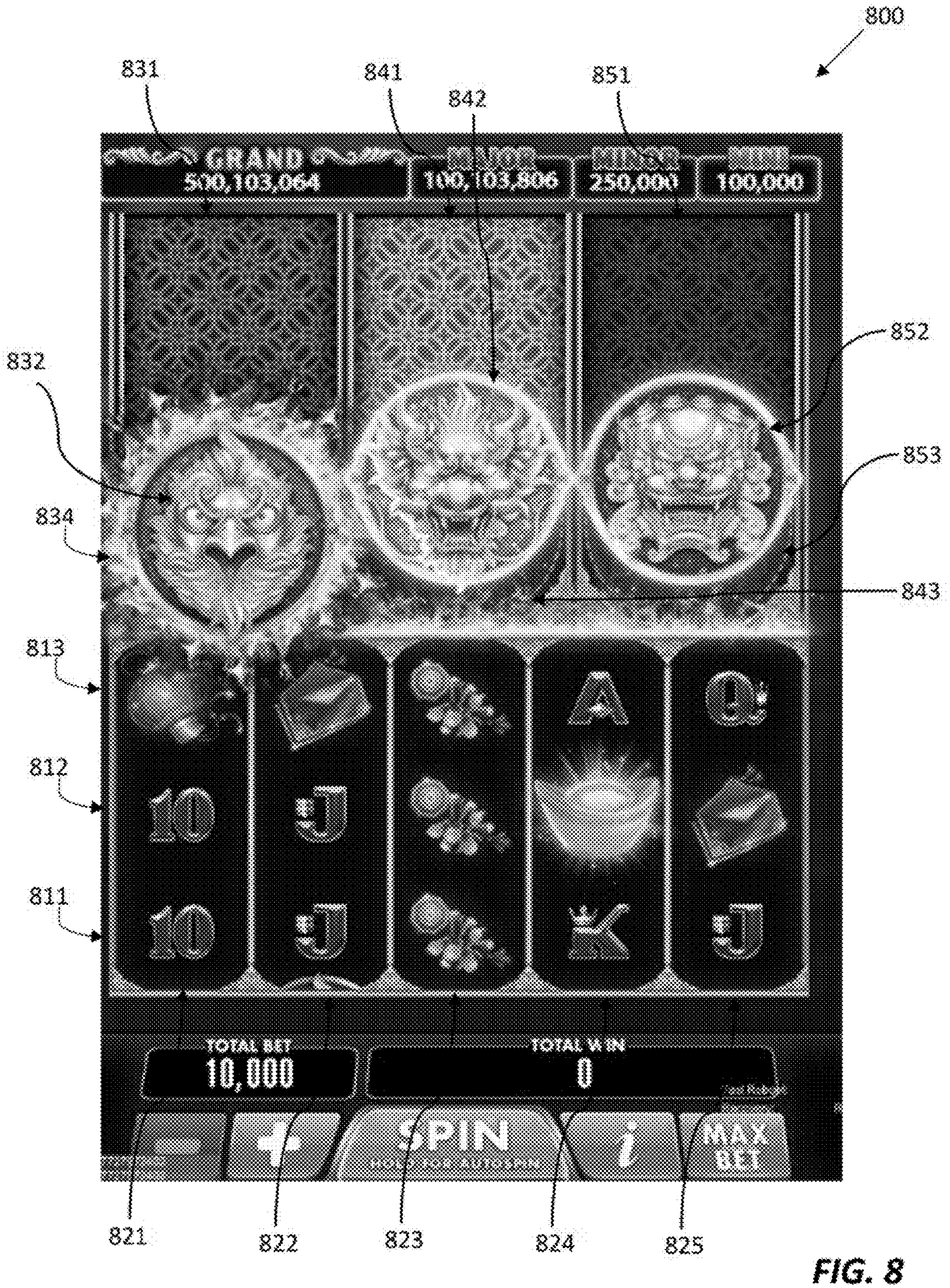
FIGS. 8 to 42 are exemplary screen displays.

FIG. 5 is a flow chart of an example embodiment of a method 500 of operating a gaming device. At step 505, the processor 204 initiates a first game instance (e.g. a base game) in response to receiving a wager (e.g. in response to a player making a wager selection using buttons as described above). At step 510, the processor 204 selects symbols for a spinning reel game and controls the display 240 to display the selected symbols. FIG. 8 shows an example screen display 800 of a base game where symbols are selected from five reel strips for display in five columns of symbol positions 821-625 with three symbols being selected from each reel strip such that there are also three rows 611-613 of symbol positions.

FIG. 3 illustrates an example of a set 300 of five reel strips 341, 342, 343, 344, 345. In the example, for illustrative purposes, twenty-five reel strip positions 301-325 are shown for each reel strip 341-345. Each reel strip position of each reel has a symbol. For example, a "Wild" symbol occupies the twenty-first reel strip position 321 of the fourth reel 344 The symbols shown on the reel strip are generally indicative of symbols that may be employed in other embodiments, however, other reels strips to those illustrated in FIG. 3 can be used, for example, reel strips where two or more wild symbols are placed at consecutive reel strip positions of a reel strip. Symbol position 330 indicates that the reel strips 341-345 may have more symbols than illustrated. For example, the reel strips 341-345 could have between 30 and 100 reel strip positions with the last reel strip position of a respective reel strip being treated as contiguous with the first reel strip position 301 as would be the case with a mechanical reel. The actual lengths of the game reel strips depend on factors such as the lengths of the stacks, the number of wild symbols (in general, the more wilds there are, the longer the reel strip needs to be to maintain the target RTP), and volatility (in general, the higher the prize value is, the longer the reel strip needs to be to lower the hit rate to maintain the target RTP). In some examples, the reel strips associated with different columns may be of different lengths to one another.

Figure 4:
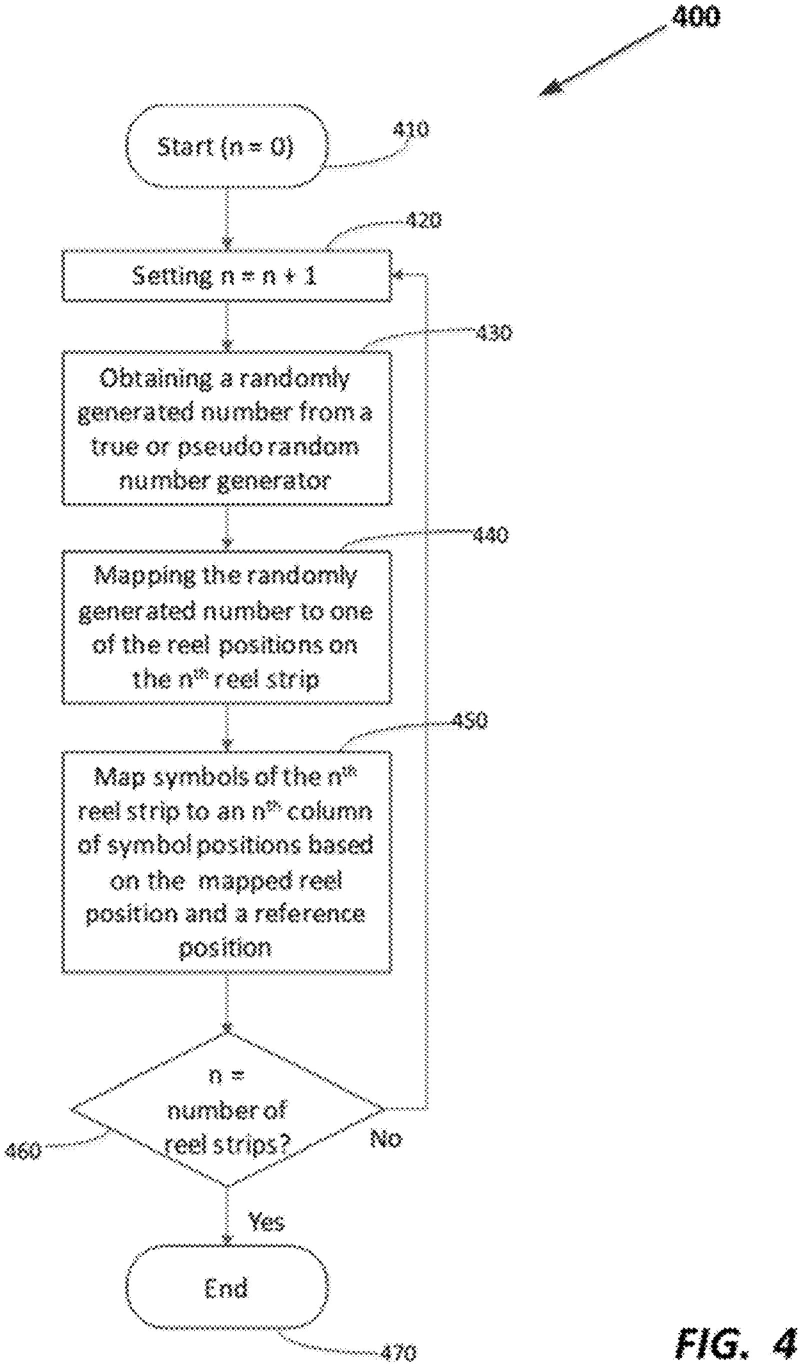
FIG. 4 is a flow chart of a symbol selection method.

FIG. 4 is a flow chart of an example method 400 carried out by the processor 204 to select symbols from reel strips at step 510. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected.

In other examples, the ranges may be arranged to weight the relative chances of selecting specific reel strip positions.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. Referring to the example reel strips of FIG. 3, if the value returned by the RNG 212 is mapped to reel position 313 when three symbols are being selected from each reel as shown in FIG. 8, then for the first reel strip 341, "10" is mapped to a bottom symbol position, "PIC3" symbol 352 is mapped to a middle symbol position, and "A" symbol 351 is mapped to a top symbol position. Each time the number of active symbol positions increases by one, an additional symbol position is mapped.

At step 460, the processor 460 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

After the symbols of all reel strips have been mapped to symbol position, the processor 204 controls display 240 to display them at the symbol positions. An example of selected symbols for a first game instance is shown in the example screen display 800 of FIG. 8.

After the symbols are selected, at step 515, the processor 204 evaluates the selected symbols for one or more winning combinations based on a pay table stored in memory. In this example, processor 204 applies a "ways to win" type evaluation by processing the selected symbols to identify instances of the same symbol appearing in consecutive ones of the columns 821-925 starting with (and including) the first column. Upon there being one or more winning combinations, the processor 204 makes an award at step 520, for example, by adding credit amounts defined by the pay table to a win meter in memory 204.

At step 525, the processor 204 determines whether the selected symbols include one or more trigger symbols and, if not, the game instance ends at step 530.

As shown in FIG. 8, the processor 204 also controls the display 240 to display three feature indicators 831, 841, 851 corresponding to three different feature games involving at least one additional game instance that can be triggered from the base game instance. As shown, in FIG. 8, each feature indicator 831, 841, 851 comprises a feature icon 832, 842, 852 corresponding to a respective one of the feature games. In the embodiment, each feature icon shares at least one visual characteristic in common with the trigger symbols 832, 842, 852 associated with the respective feature game as will become apparent from example screen displays described below. Each feature indicator has a plurality of states, each state comprising a different position of the respective feature icon 832, 842, 852. In an example, there are five different states with the fifth position being a final state. In the screen display 800 of FIG. 8, first feature icon 841 of first feature indicator is in the final state/fifth position. This is emphasized by the addition of a flame border 834 around the first feature icon 832.

The second feature icon 842 and third feature icon 852 are shown in a fourth state/position. In this state (and all other states) the second and third feature indicators each include an indication of a position to be occupied by the respective feature icon in a final state in the form of a dotted line 843, 853 that outlines the final position. These final position indications assist in visually communicating indicating the progress towards a final state, and indeed, that there is a final state for the respective feature indicators 831, 841, 851.

At step 535, the processor 204 determines whether to change the feature indicator in respect of the respective feature games. In an example, this determination is conducted by the processor in all game instances where the respective feature indicator has not reached the final state to determine whether to advance the feature indicator by one position. In an example, a random determination is conducted by the processor 204 using random number generator 212 for each instance of a corresponding trigger symbol selected at step 510. In an example, the instructions executed by the processor 204 configure the random determination so that movement from an initial position to the final position will on average match the average triggering rate for the corresponding feature. That is, if on average the feature game will be triggered every T games, the corresponding feature icon will also move to the final position every T games.

It will be observed that in this example, the feature game does not automatically initiate upon the feature indicator reaching the final position. In other examples, the feature is initiated by the processor 204 upon the indicator reaching the final position.

When the random determination results in a decision by the processor 204 to change one or more of the feature indicators 831, 841, 851, the relevant feature indicator is updated at step 540.

At step 545, processor 204 determines whether there is a complete combination of trigger symbols in respect of one or more of the feature games and if there is a complete trigger updates the relevant feature indicator(s) at step 555 by moving the relevant feature icon(s) to the final position. Processor 204 then proceeds to step 560 and initiates the relevant feature game. If more than one feature is triggered, processor 204 conducts them in a defined order.

In this respect, in an example, a first feature game corresponding to first feature game indicator 831 is a free games feature where a number of game instances are awarded based on a player choice as described in relation to FIG. 26 below. A complete trigger requires a threshold of three scatter symbols selected for any of the symbol display positions. These scatter symbols are shown as SCAT1 in FIG. 3 above and is represented as a Phoenix symbol 1061 when selected for display, as shown, for example, in FIG. 10. As will be observed, Phoenix symbol 1061 shares many visual characteristics with first feature indicator icon 832.

The second feature game corresponding to second feature indicator 841 is a Match 3 feature (see FIG. 23) where a player touches symbols until three matching prizes are awarded. A complete trigger requires a threshold of three scatter symbols selected for any of the symbol display positions where one of the scatter symbols is specific to the second feature. The scatter symbol specific to the Match 3 feature, is shown as SCAT2 in FIG. 3 and is represented as a Dragon symbol 1652 when selected for display, as shown, for example, in FIG. 16. As will be observed, Dragon symbol 1652 shares many visual characteristics with second feature indicator icon 842.

The third feature game corresponding to third feature indicator 851 is a hold and spin feature where three game instances are awarded when the feature game is triggered, and the number of game instances is reset when a reset condition is met. During the hold and spin feature, prize value symbols are held in place once selected (including prize value symbols displayed as a result of the feature being triggered). In an example, a complete trigger requires a threshold of six prize value symbols selected for any of the symbol display positions. The prize value symbols are shown as COR ("Cash on Reels" in FIG. 3) and can also be termed "Configurable" symbols because in some examples, the prize values are dynamically assigned to the symbols from a look up table by the processor in each game instance. The prize value symbols are represented as Lion symbols 1063 when selected for display, as shown, for example, in FIG. 10. As will be observed, Lion symbol 1063 shares many visual characteristics with third feature indicator icon 853.

In cases where there is at least one trigger symbol but less than the threshold required for a complete trigger, processor 204 proceeds to step 550 and conducts a random determination to determine whether to trigger the feature using random number generator 212. Advantageously, this provides an additional mechanism by which the features can be triggered when only part of the required trigger combination is present in the selected symbols. In an example, a separate random determination is conducted for each trigger symbol. In another example, fewer than all the feature games may have this additional trigger mechanism. Depending on the outcome of the random determination, the processor 204 either ends the game instance at step 530 or initiates 560 the relevant feature(s).

Figure 9:
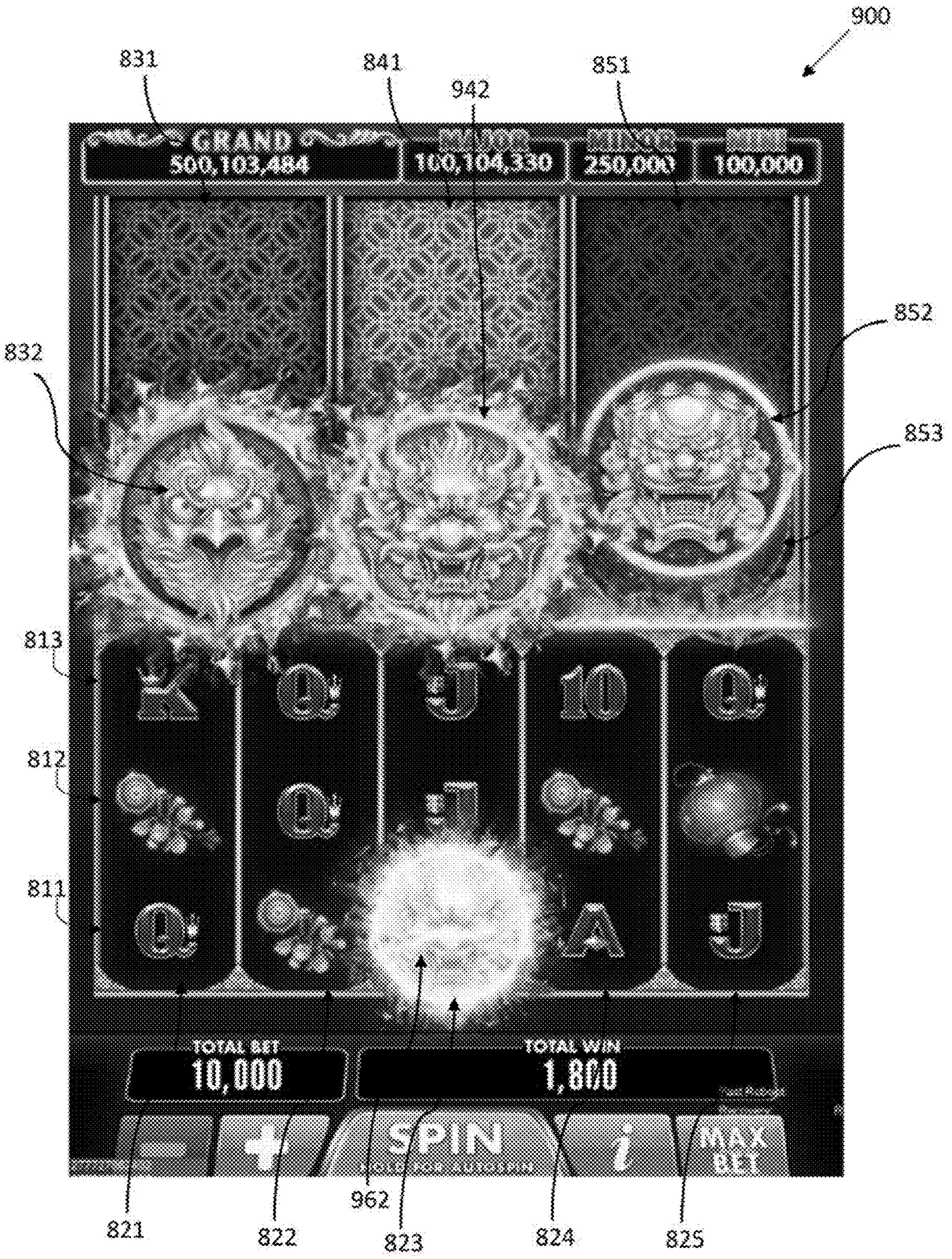
Figure 10:
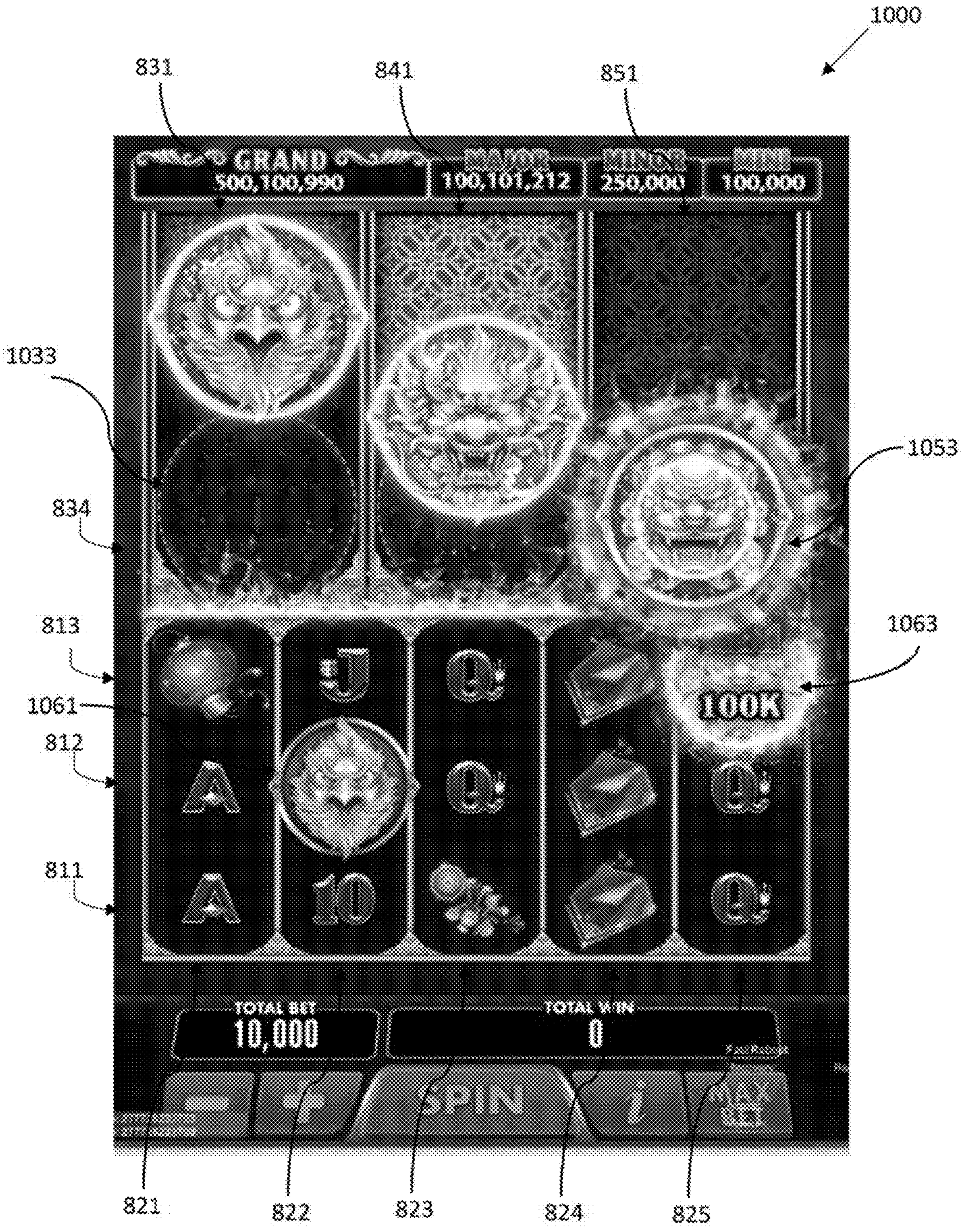

Example screen displays 900, 1000 of FIGS. 9 and 10 illustrate examples of how the additional trigger mechanism operates.

Referring to FIG. 9 there is shown an example screen display 900 of a game state subsequent to the game state of FIG. 8. In this example, Dragon symbol 962 has been selected and displayed in the symbol position defined by the intersection of the bottom row 811 and the third column 823. This is the only selected Dragon symbol, accordingly in implementing the method of FIG. 5, processor 204 proceeds to step 550 and conducts a random determination. FIG. 9 shows an example where the result of this determination is to trigger the feature. As a result, in FIG. 9, the Dragon icon 942 of the second feature indicator 841 has been moved to the final position. In FIG. 9, the Dragon icon 942 has also been enlarged and turned gold to indicate that it has caused a trigger.

FIG. 10 shows another example screen display 1000 of an alternative game state. In this example, both Phoenix symbol 1061 and Lion symbol 1063 have been selected and displayed. With the Phoenix symbol 1061 in the symbol position defined by the intersection of the middle row 812 and the second column 822 and the Lion symbol 1063 in the symbol position defined by the intersection of the top row 813 and the fifth column 825. The Lion symbol 1063 carries the prize value of "MINI 100K" (A mini jackpot of 100,000 credits). As neither of these symbols provides a complete trigger at step 545, accordingly in implementing the method of FIG. 5, processor 204 proceeds to step 550 and conducts a random determination for each symbol 1061, 1063. FIG. 10 shows an example where a result of the determination corresponding to the Phoenix symbol 1061 is to not trigger the first feature, accordingly the Phoenix symbol is displayed in a normal state. The result of the determination corresponding to the Lion symbol 1063 is to trigger the third, hold and spin feature. As a result, in FIG. 10, the Lion icon 1053 of the third feature indicator 851 has been moved by processor 204 to the final position at step 555. In FIG. 10, the Lion symbol 1063 has also been enlarged and turned gold to indicate that it has caused a trigger.

Figure 7:
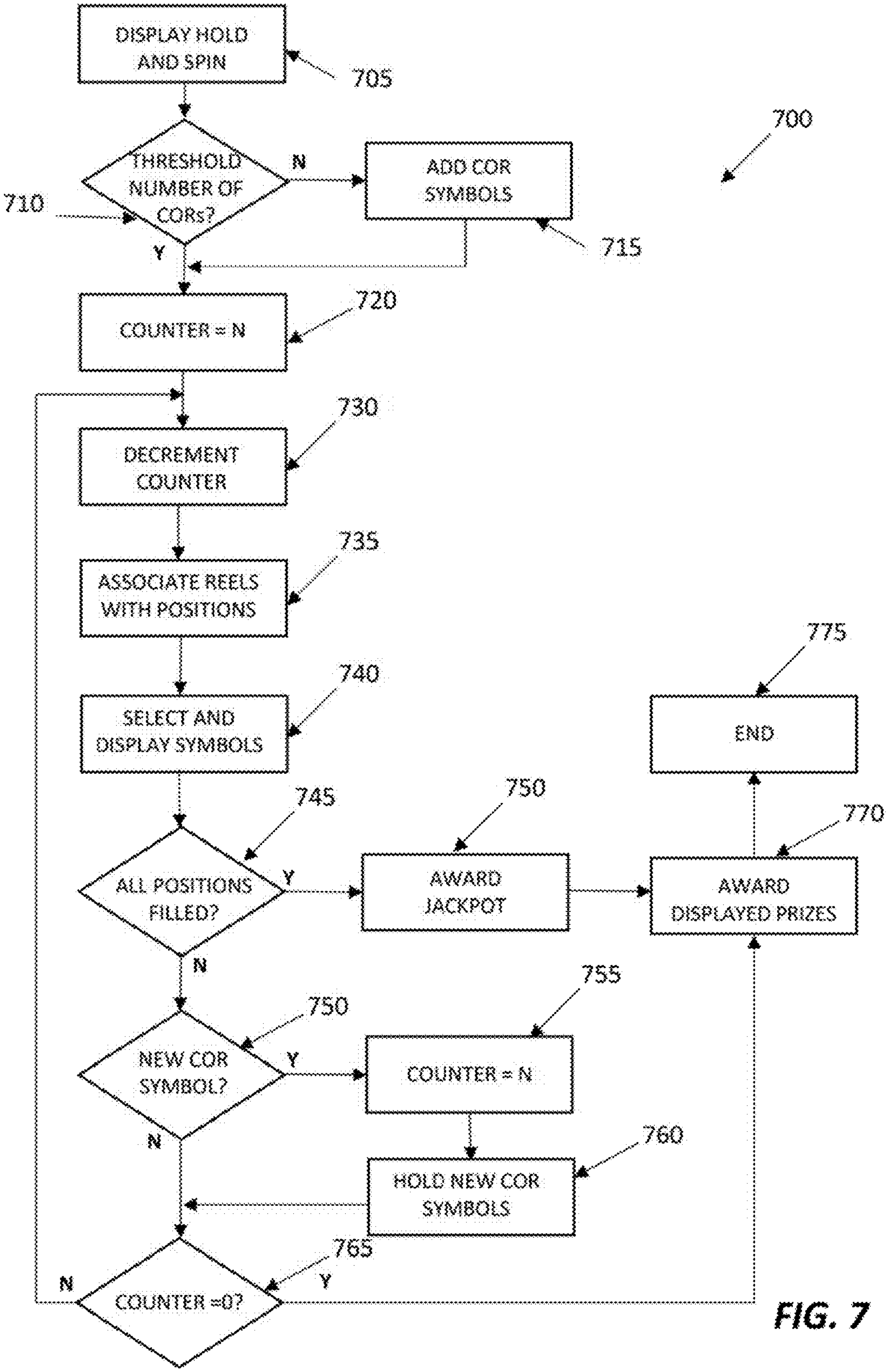
FIG. 7 is another flow chart of a method of operating a gaming device.

FIG. 7 is a flow chart 700 of an embodiment of a hold and spin feature game (the third feature game described above) and FIGS. 11 to 13 are examples of screen displays from a hold and spin game initiated responsive to the determination by the processor 204 to trigger described in relation to FIG. 10.

Figure 11:
Figure 12:
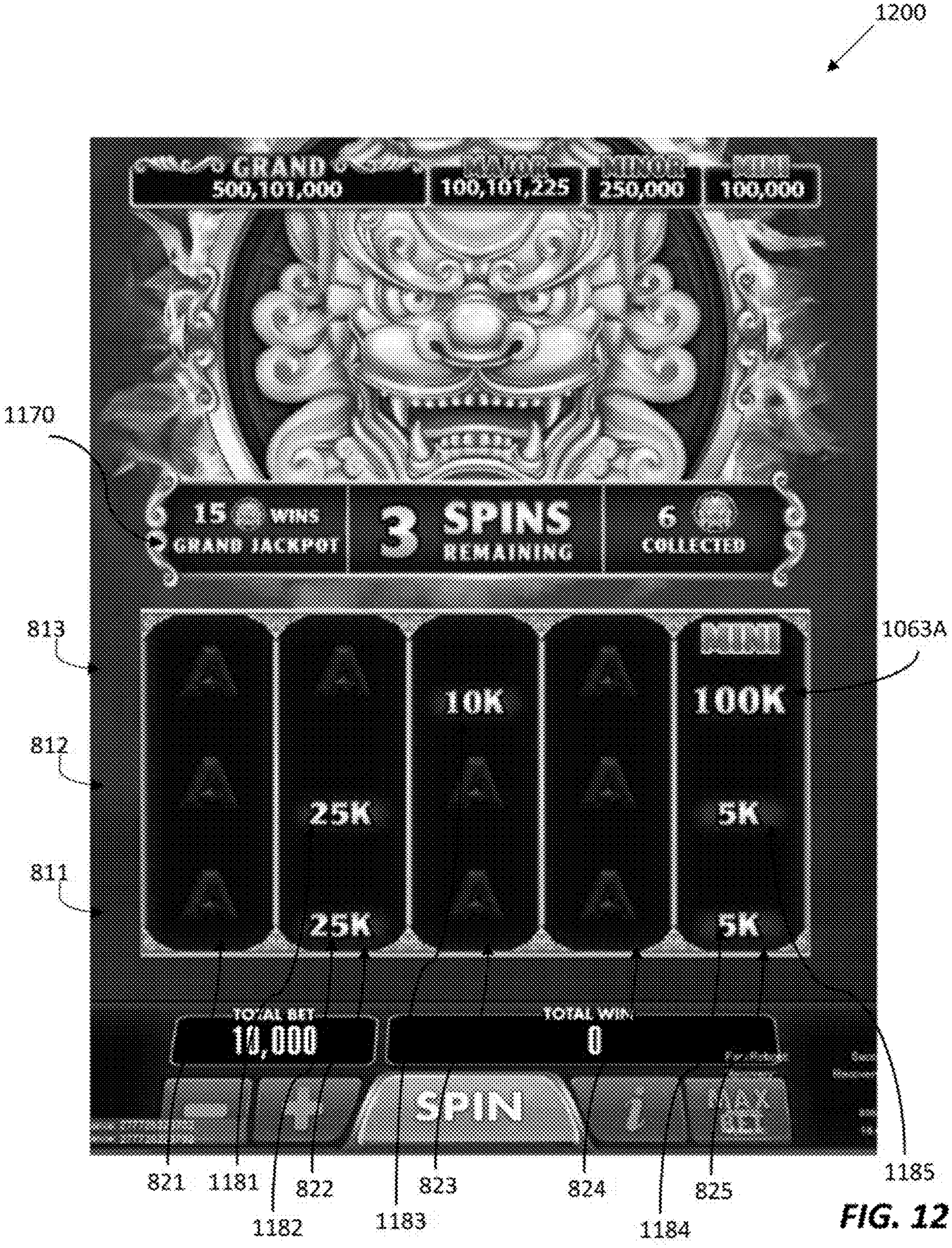

At step 705, execution of the instructions in memory 208 causes the processor 204 to change the display to display an initial screen display 1100 of the hold and spin feature game as shown in FIG. 11. In FIG. 11, the same array of five columns 821-825 and three rows 811-813 of symbol positions. It will be observed that a simplified version 1063A of the Lion prize value symbol 1063 of FIG. 10 (showing the prize value) is held at the symbol position where it led to the hold and spin feature being triggered. A feature status graphic 1170 is also displayed on display 240 under control of the processor 204. The status graphic 1170 indicates that "15 [Lion] symbols wins Grand Jackpot", that there are "3 Spins remaining" and "6 [Lion] symbols" have been collected. In this respect, it will be observed that only one simplified prize value symbol is displayed in FIG. 11. At step 710, the processor 204 determines whether the feature is triggered with the threshold number of prize value (COR) symbols and if not, proceeds to step 715 and adds COR symbols to meet the threshold. In this example, the threshold is six COR symbols so five prize value symbols 1181-1185 are added in simplified form to form the screen display 1200 of FIG. 12 and so that "6 [Lion] symbols" have been collected.

At step 720, processor 204 sets the initial counter for the spins to N in memory 208 (in this example 3 spins). Then at step 730, processor 204 decrements the counter by one as the spin is initiated. At step 735, the processor 204 associates reel strips with symbol positions so that there is a single reel strip associated with each symbol position. In this example, the reel strips used in the hold and spin feature comprise prize value symbols and blank symbols so that the outcome of each symbol selection is either a further prize value (COR) symbol or no symbol. In an example, there are two classes of reel strips, a first type having a probability of a prize value being selected that controls the probability of the Grand Jackpot prize being awarded and a second type that typically has more prize value symbols than the first type. The first type is always randomly associated by processor 204 with a symbol position first so that if only one symbol position remains, it will be used. Reel strips from the second type are associated with symbol positions until one is assigned to each symbol positions.

At step 740, symbols are selected for symbol positions using a modified version of the process of FIG. 4, where only one symbol (or blank) need be selected for each symbol position and rather than iterating through columns, the processor 204 iterates through symbol positions not already occupied by a prize value symbol.

At step 745, processor 204 determines whether all symbol positions are occupied by a prize value symbol, and if not, proceeds to step 750 where it determines whether a new prize value (COR) symbol was selected in the current game instance. If not, processor 204 proceeds to step 765 and determines whether the counter has reached zero (i.e. the hold a spins are finished). If not, processor 204 reverts to step 730.

When processor 204 determines at step 750 that there are one or more new prize value symbols, the processor 204 holds the new prize value symbols in place at step 760 and the counter will not be at zero at step 765 so that the processor 204 reverts to step 730.

Figure 13:

When processor 204 determines at step 765 that the counter is zero, the processor 204 awards the displayed prizes at step 770 as shown in the example screen display of FIG. 13, where the fourteen displayed prize value symbols carry total prize values of 245K so that feature status is updated to show "Win 245K Win" indicating a win of 245,000 credits.

When processor 204 determines at step 745 that all symbol positions are filled by prize value symbols, processor 204 proceeds to step 750 and awards a Grand Jackpot prize (typically the largest available prize) and then awards at step 770 the prizes displayed on the prize value symbols. (Note that the processor 204 would have awarded the Grand Jackpot if one more prize value symbol had been collected in the example of FIG. 13.)

After the displayed prizes have been awarded, the hold and spin feature ends 775.

Figure 14:
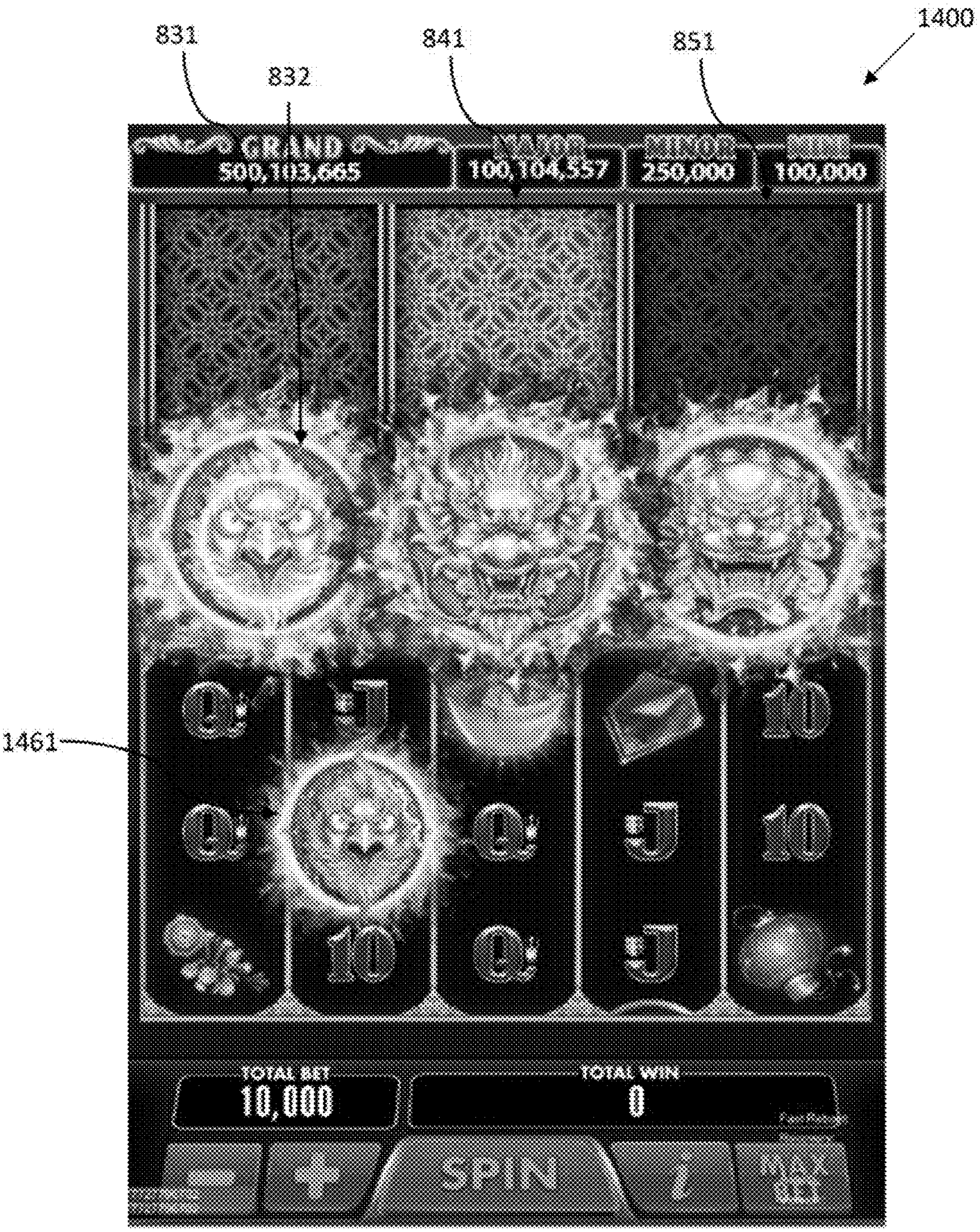

As described in relation to FIG. 5 above, a free games feature can be triggered at step 550 in response to selection of one or more Phoenix symbols. FIG. 14 is an example screen display corresponding to this scenario, where responsive to the selection of Phoenix symbol 1461, the processor has determined at step 550 to initiate the free games feature. It will be observed that Phoenix icon 832 of free games feature indicator 831 has been moved on display 240 under control of processor 204 to the final position of the feature indicator at step 555.

Figure 15:
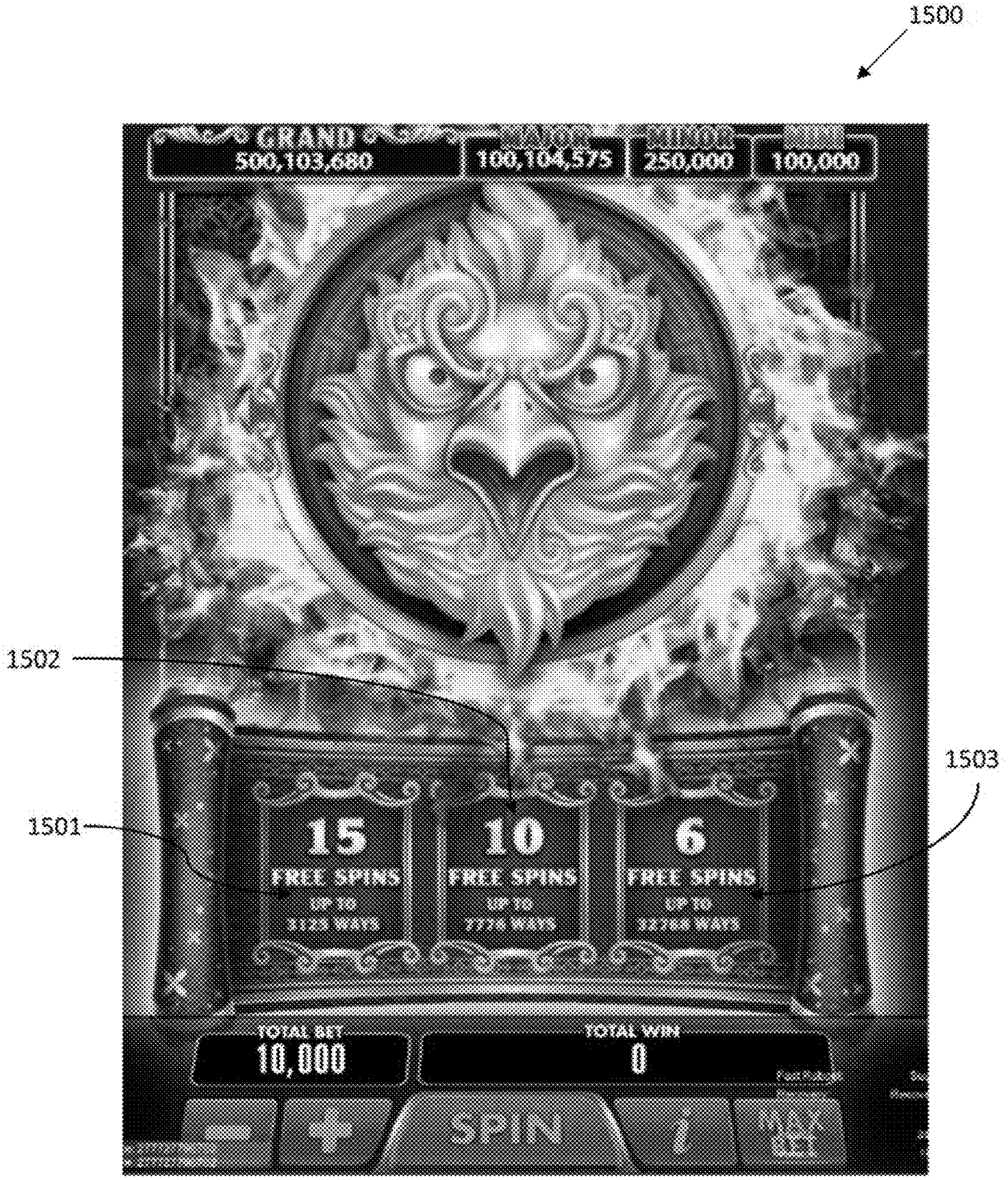

As shown in FIG. 15, after the free games feature is triggered, processor 204 controls display to display a feature selection screen display 1500. In this embodiment, the player is presented with three selectable options 1501-1503. A first option 1501 involves the award of "15 Free Spins, Up To 3125 Ways" (corresponding to an award of array size of 3 rows by 5 columns up to an array size of 5 rows by 5 columns). A second option 1502 involves the award of "10 Free Spins, Up To 7776 Ways" (corresponding to an award of array size of 3 rows by 5 columns up to an array size of 6 rows by 5 columns). A third option 1503 involves the award of "6 Free Spins, Up To 32768 Ways" (corresponding to an award of an array size of 3 rows by 5 columns up to an array size of 8 rows by 5 columns).

Figure 6:
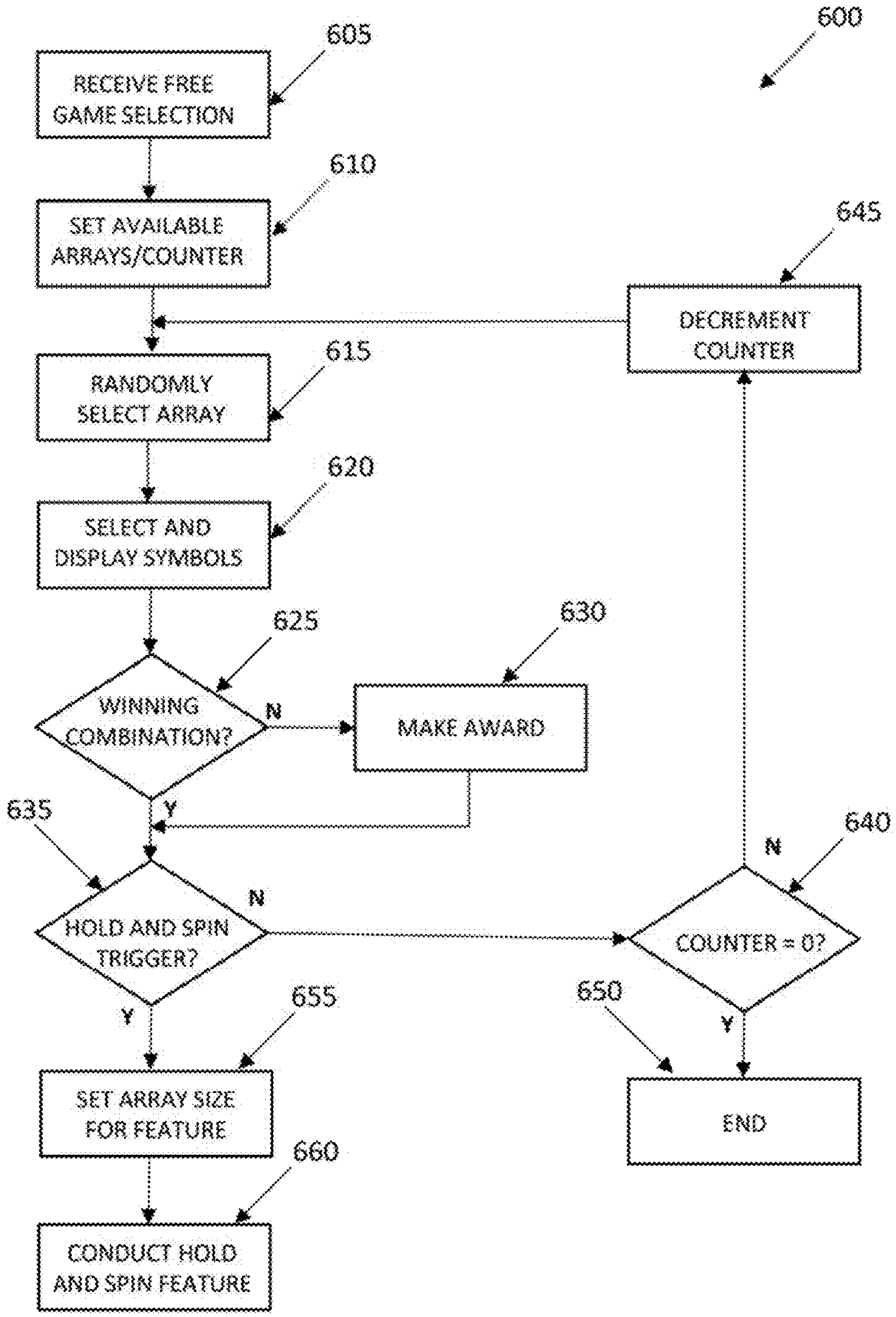
FIG. 6 is another flow chart of a method of operating a gaming device.

Referring to FIG. 6, at step 605, processor 204 receives one of the selections and sets the available arrays and a free game counter to correspond to the selection.

At step 615, execution of the instructions cause the processor 204 to randomly select an array from among the available arrays. In one example, there are a plurality of weighted tables in memory 208 that correspond to the possible sets of available arrays of symbol positions and the processor 204 randomly selects an array using the weighted table corresponding to the selected option.

At step 620, the processor 204 selects and displays symbols using the process described in relation to FIG. 4 in which it will be appreciated that the number of symbols mapped at step 450 depends on the size of the array (number of rows) for which symbols are selected.

Figure 16:
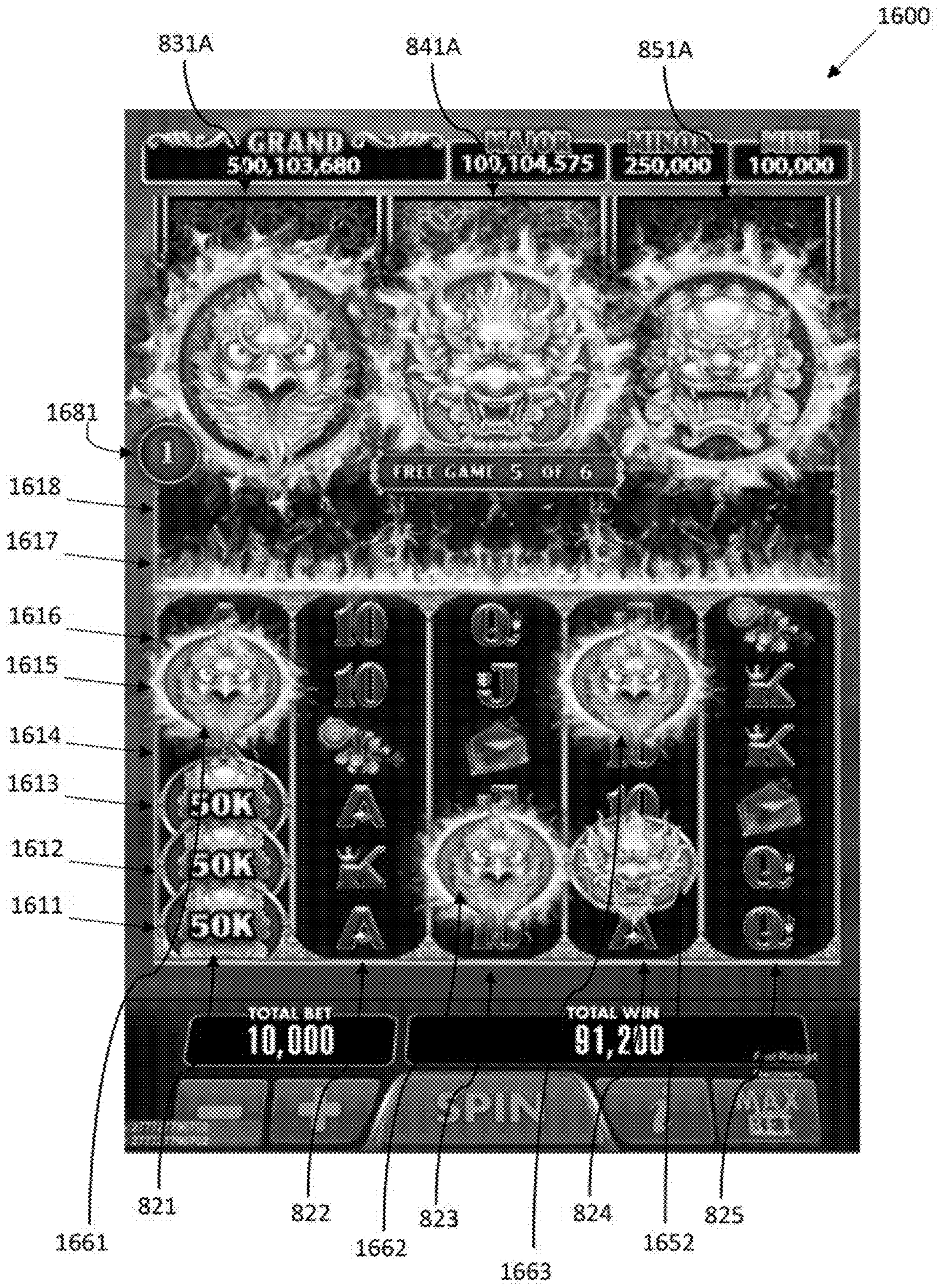

FIG. 16 is an example screen display 1600 of an outcome of the symbol selection and display step 620. FIG. 16 shows an example where the received selection was "6 Free Spins" and "Up to 32768 Ways", or up to eight rows. FIG. 16 shows an example where processor 204 has selected an array comprising 6 rows at step 615 so that first to sixth rows 1611-1616 are active and symbols are selected for the symbol positions of active roles while seventh and eighth rows 1617, 1618 are inactive so that symbols are not selected for those rows.

FIG. 16 shows an example where a complete free games trigger in the form of three Phoenix symbols 1661-1663 has been selected resulting in the free games being re-triggered as denoted in screen display 1600 by the addition of a number "1" 1681 to feature indicator 831A to indicate that a further set of free games will be initiated after the current set of free games is completed. This re-triggering process is excluded from FIG. 6 for simplicity. It will also be observed that the processor 204 has controlled the display 240 to display modified feature indicators 831A, 841A, 851A to accommodate the additional rows of symbol positions. This advantageously enables the feature indicators to be maintained with an enlarged array size.

In examples where no hold and spin trigger occurs at step 635, processor 204 proceeds to step 640 and determines whether the free game counter has reached zero. Where the counter has not reached zero (i.e. all the free games have not been conducted), processor 204 proceeds to step 645 and decrements the counter before randomly selecting a further array at step 615 and selecting further symbols at step 620. In all iterations, processor 204 determines whether there is a winning combination based on pay table and makes any awards at step 630. When the counter is zero at step 640, the free games feature ends at step 650.

Figure 17:
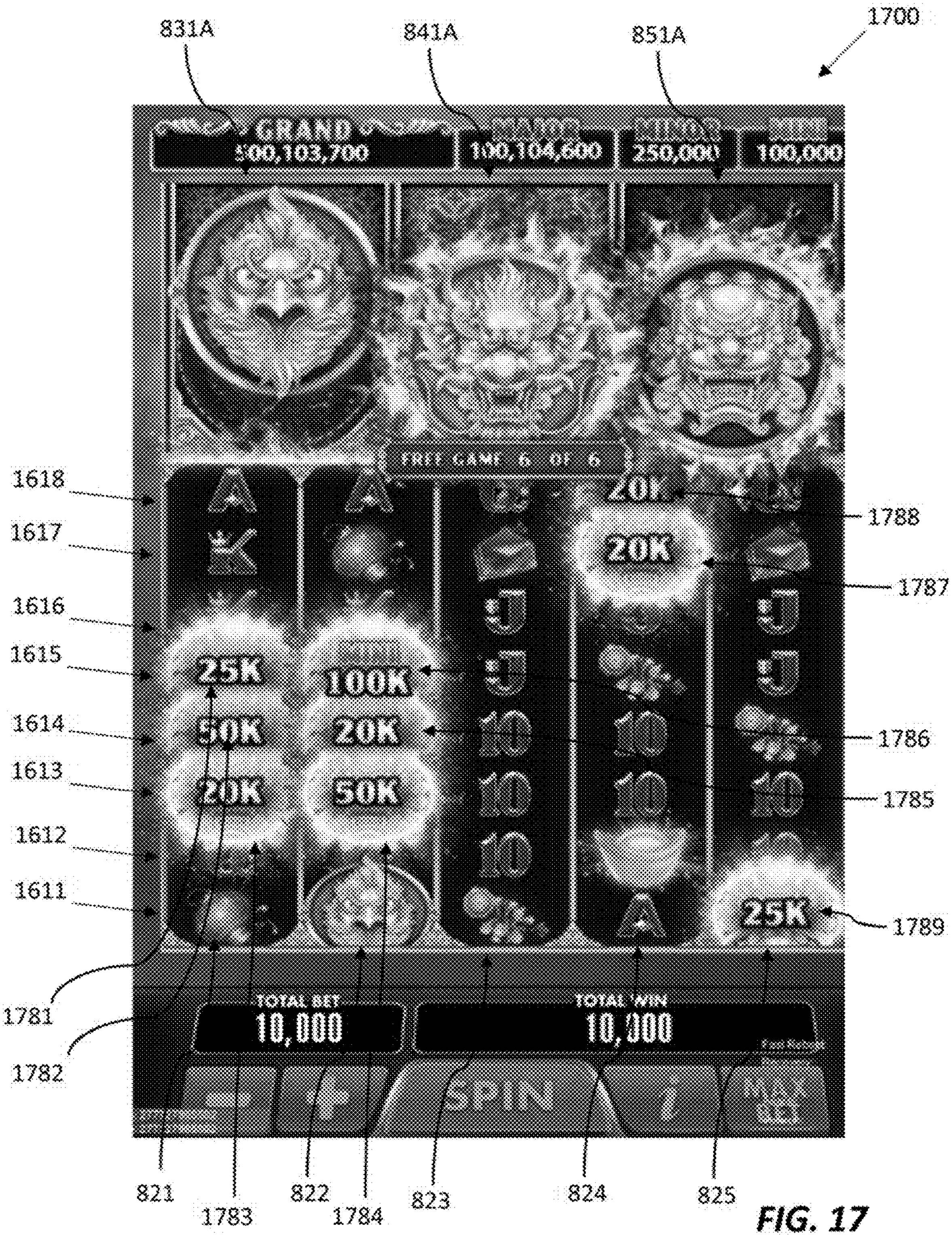

FIG. 17 shows another example screen display 1700 of an outcome of the symbol selection and display step 620 corresponding to the same selection being received at step 605. In this example, symbols have been selected for symbol positions in an array of eight rows 1611-1618 and five columns 821-825 selected at step 615. The selected symbols include nine prize value symbols 1781-1789. As the nine prize value symbols exceed the threshold of six prize symbols for triggering the hold and spin feature, the processor 204 determines at step 635 that there is a hold and spin feature trigger.

At step 655, processor 204 sets the array size for the hold and spin feature.

Figure 18:
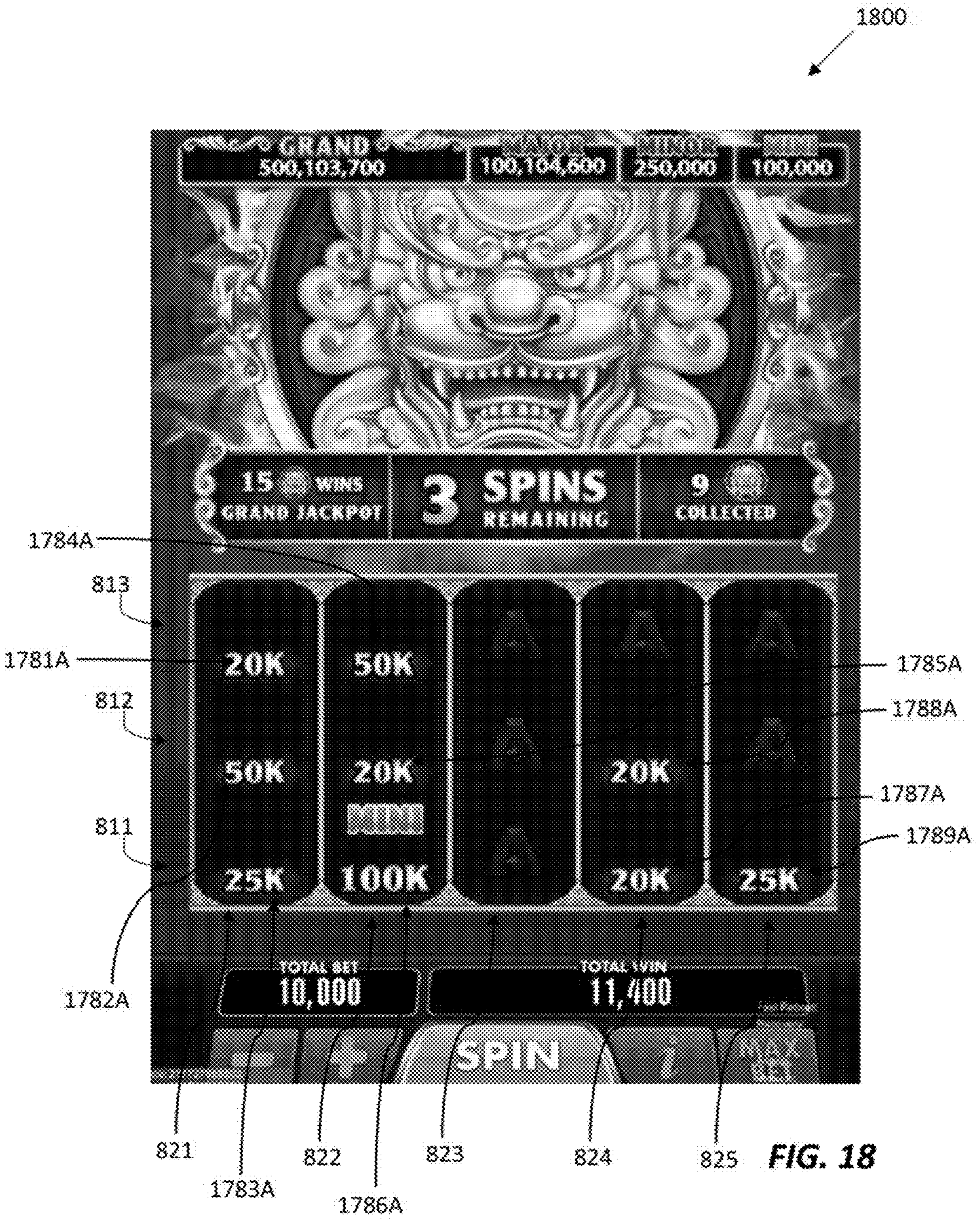

FIG. 18 illustrates an example screen display 1800 in which the processor 204 sets a fixed size array of three rows 811-813 and five columns 821-825. In this example, as there are fewer symbol positions, processor 204 repositions the triggering prize value symbols 1781A-1789A within the smaller array of symbol positions so that all the triggering symbols are held in position at the beginning of the hold and spin feature. Processor 204 also controls the display 240 to display the prize symbols 1781A-1789A in simplified form. At step 660, processor 204 conducts the hold and spin feature in the manner described above in relation to FIG. 7 so that in this example, reel strips are initially associated with six symbol positions.

Figure 19:

FIG. 19 is an example screen display 1900 at the conclusion of the hold and spin feature game of FIG. 18 where a prize of 445,000 credits has been awarded by the processor 204.

Figure 20:
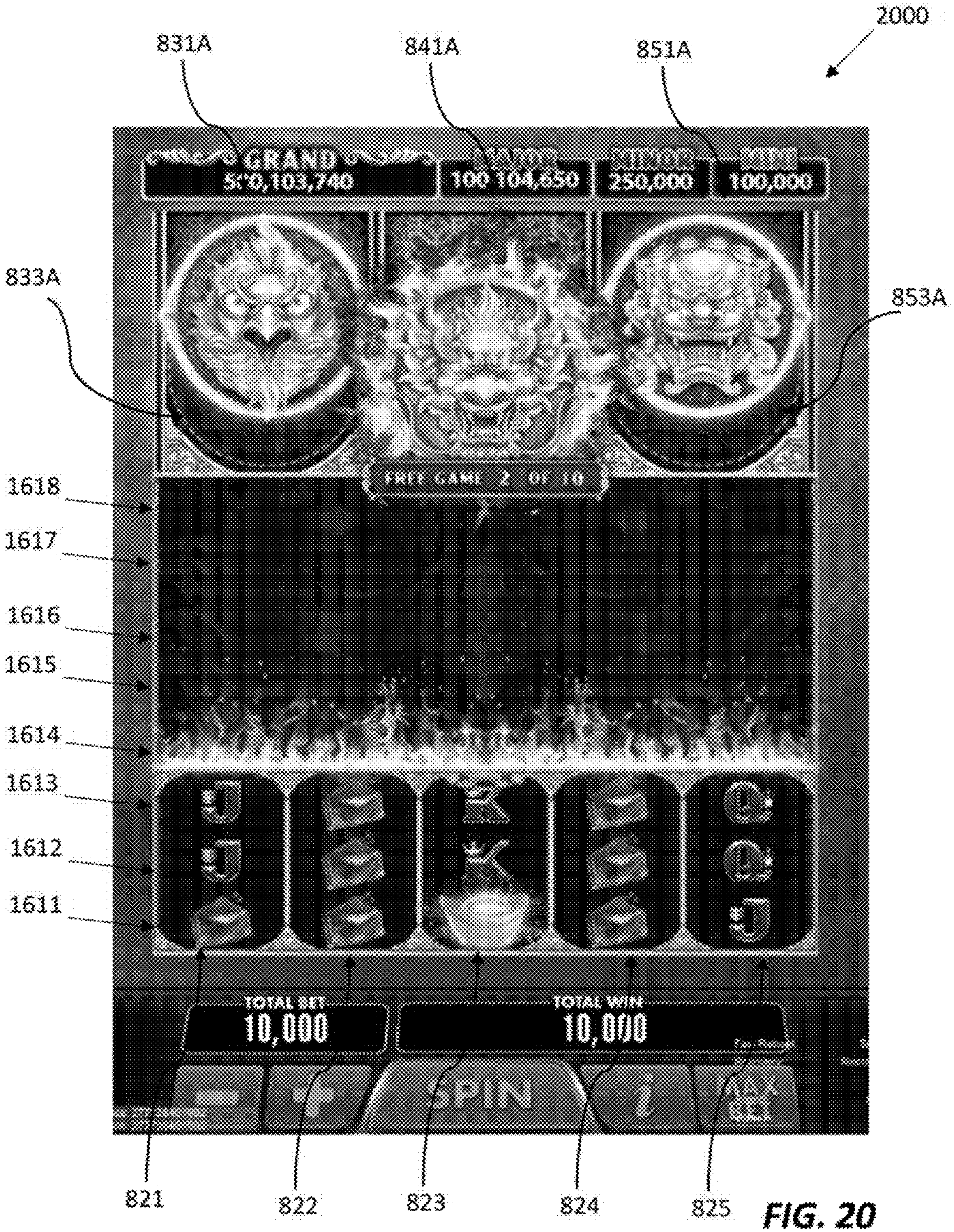

FIG. 20 is an example screen display 2000 during another example free game feature. In this example, the processor 204 received a selection of option 1502 "10 Free Spins, Up To 7776 Ways" (corresponding to an award of array size of 3 rows by 5 columns up to an array size of 6 rows by 5 columns). Accordingly, in this example, symbol positions in seventh and eight rows 1617, 1618 will always be inactive. FIG. 20 shows an example in a second free game (second game instance) where symbol positions of the first to third rows 1611-1613 are active and fourth to sixth rows are inactive for this game instance. In this example there are $3^5=243$ ways to win.

In the screen display 2000, modified final position indications 833A, 853A are shown for first and second modified feature indicators 831A, 851A.

Figure 21:
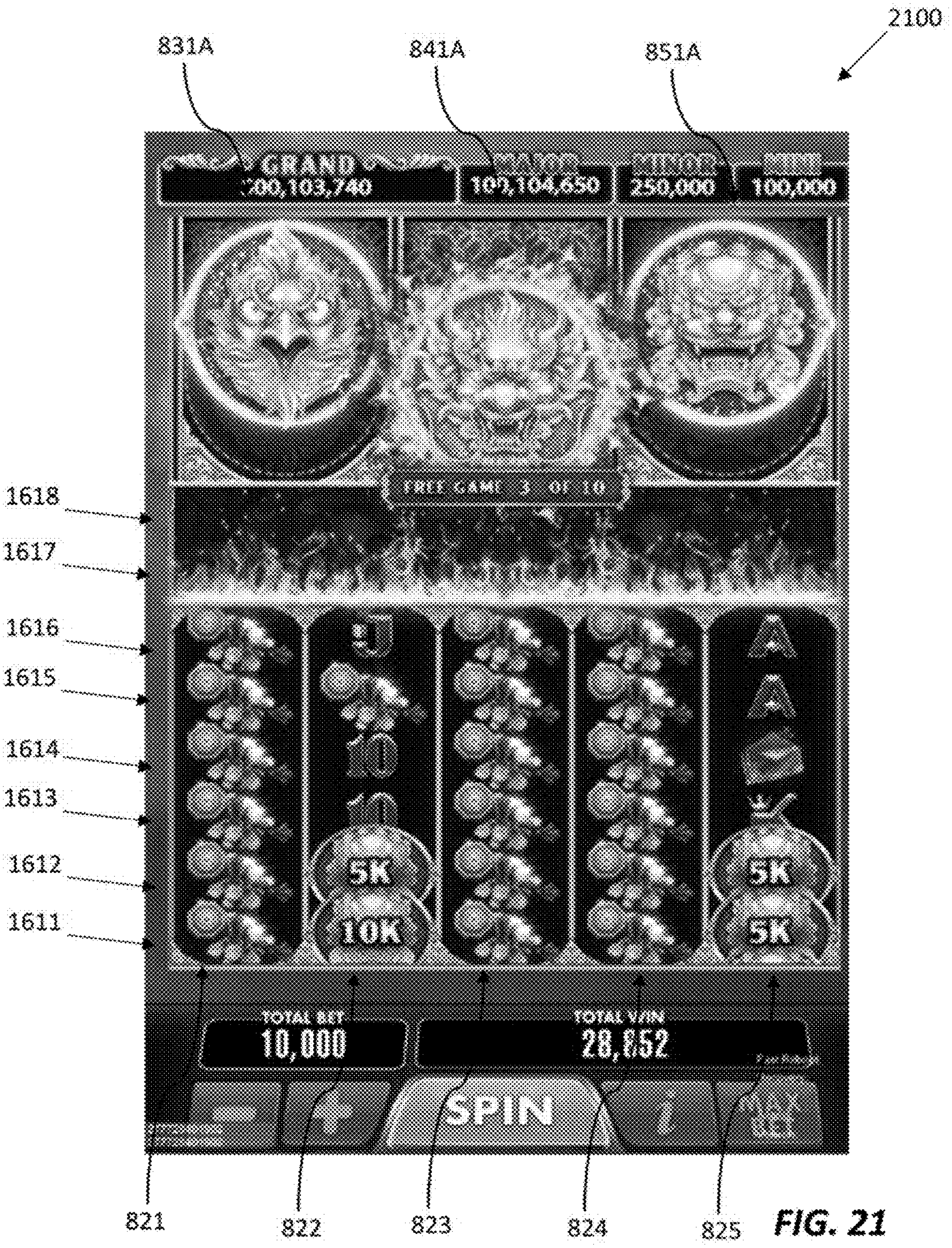

FIG. 21 is an example screen display during the next (third) free game showing an example where the largest available array with rows 1611-1616 active has been randomly selected by processor 204 at step 615 so that there are 7776 ways to win.

FIGS. 22-36 illustrate an alternative embodiment of a method of operating the gaming device that employs variations on the mechanisms described above using alternative visual characteristics.

Figure 22:

The screen display 2200 of FIG. 22 incorporates feature indicators for the same feature games described above. A first feature is a free games feature and is associated with a first feature indicator 2231 that incorporates a Princess icon 2232 that has visual characteristics corresponding to associated Princess symbol 2271 which is a trigger symbol for the free games feature. In FIG. 22, the Princess icon 2232 is in an initial position for the first feature indicator 2231 and dotted outline 2233 indicates the final position/final state for the first feature indicator 2231. In this example, the name of the feature "Free Games" 2234 is incorporated into the first feature game indicator 2231.

Figure 23:
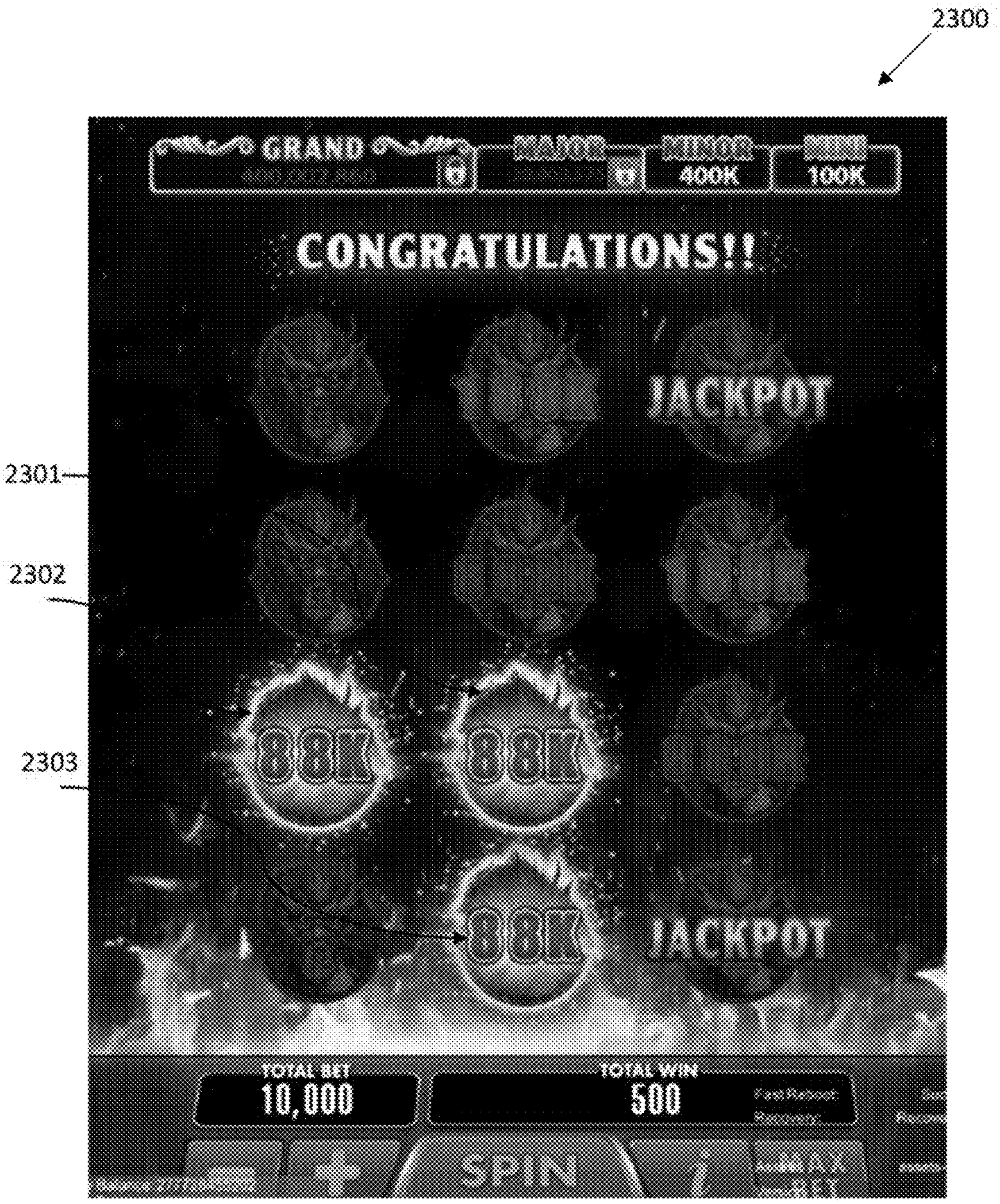

The second feature game is a match three prizes feature and is associated with is associated with a second feature indicator 2241 that incorporates a Dragon icon 2242 that has visual characteristics corresponding to associated Dragon symbol 2272 which is a trigger symbol for the match three prizes feature when it occurs in combination with two or more Princess symbols. In FIG. 22, the Dragon icon 2242 has been moved into the final position/final state for the second feature indicator by the processor 204 in response to the trigger condition being met for the second feature. In this example, the name of the feature "Match Three" 2244 is incorporated into the second feature game indicator 2241 and additional animation effects (e.g. lighting highlights) are added to the name of the feature to indicate the triggering event. FIG. 23 shows an example screen display 2300 at the conclusion of the Match Three feature where the player has touched symbols on the display until three matching prize symbols are revealed. In this example, three "88K" symbols 2301-2303 corresponding to an award of 88,000 credits.

Referring again to FIG. 22, a third feature game implemented by the gaming device 200 in this embodiment is a hold and spin feature and is associated with a third feature indicator 2251 that incorporates a Buddha icon 2252 that has visual characteristics corresponding to associated Buddha prize value symbol 2273 which is a trigger symbol for the hold and spin feature. In FIG. 22, the Buddha icon 2232 is in an initial position for the third feature indicator 2251 and dotted outline 2253 indicates the final position/final state for the third feature indicator 2251. In this example, the name of the feature "Hold N' Spin" 2254 is incorporated into the third feature game indicator 2251.

Figure 24:

FIG. 24 is a further screen display 2400 that illustrates an animation effect that communicates the determinations made by processor 204 at step 540 and step 550. In this respect, upon a trigger symbol being selected such as Dragon trigger symbol 2452, an animated sprite 2461 moves towards the associated feature indicator 2241 to indicate a possible change of state of the feature indicator 2241 and/or possible triggering of the feature game. Sprite 2461 shares a visual characteristic of the Dragon symbol (in this example, a green color) in order to communicate an association with the match three feature. Similarly selection of the Buddha trigger symbols 2454-2457 results in a bunch of animated sprites 2462 moving towards the feature indicator 2251. Sprites 2462 share a visual characteristic of the Buddha symbol (in this example, a gold color) in order to communicate an association with the hold and spin feature.

Figure 25:
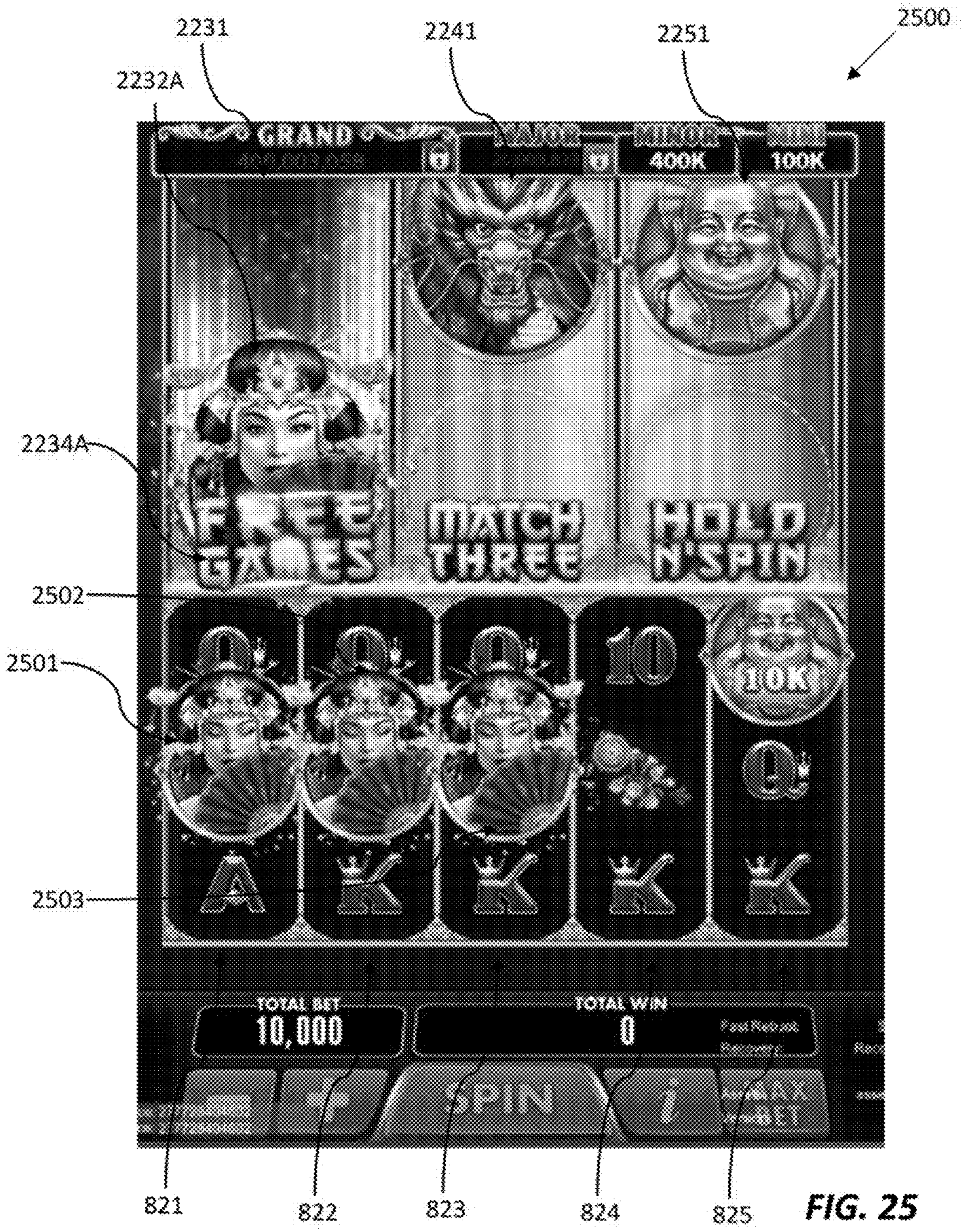

FIG. 25 illustrates an example screen display 2500 of the free games feature being triggered as a result of the processor 204 selecting three Princess symbols 2501-2503 resulting in the processor 204 determining that there is a complete trigger at step 545 and updating the feature indicator at step 555. In this respect, it will be apparent that processor 204 has modified representation of the Princess icon 2232A of updated display of the free games feature name 2234A in order to indicate award of the free games feature game.

Figure 26:
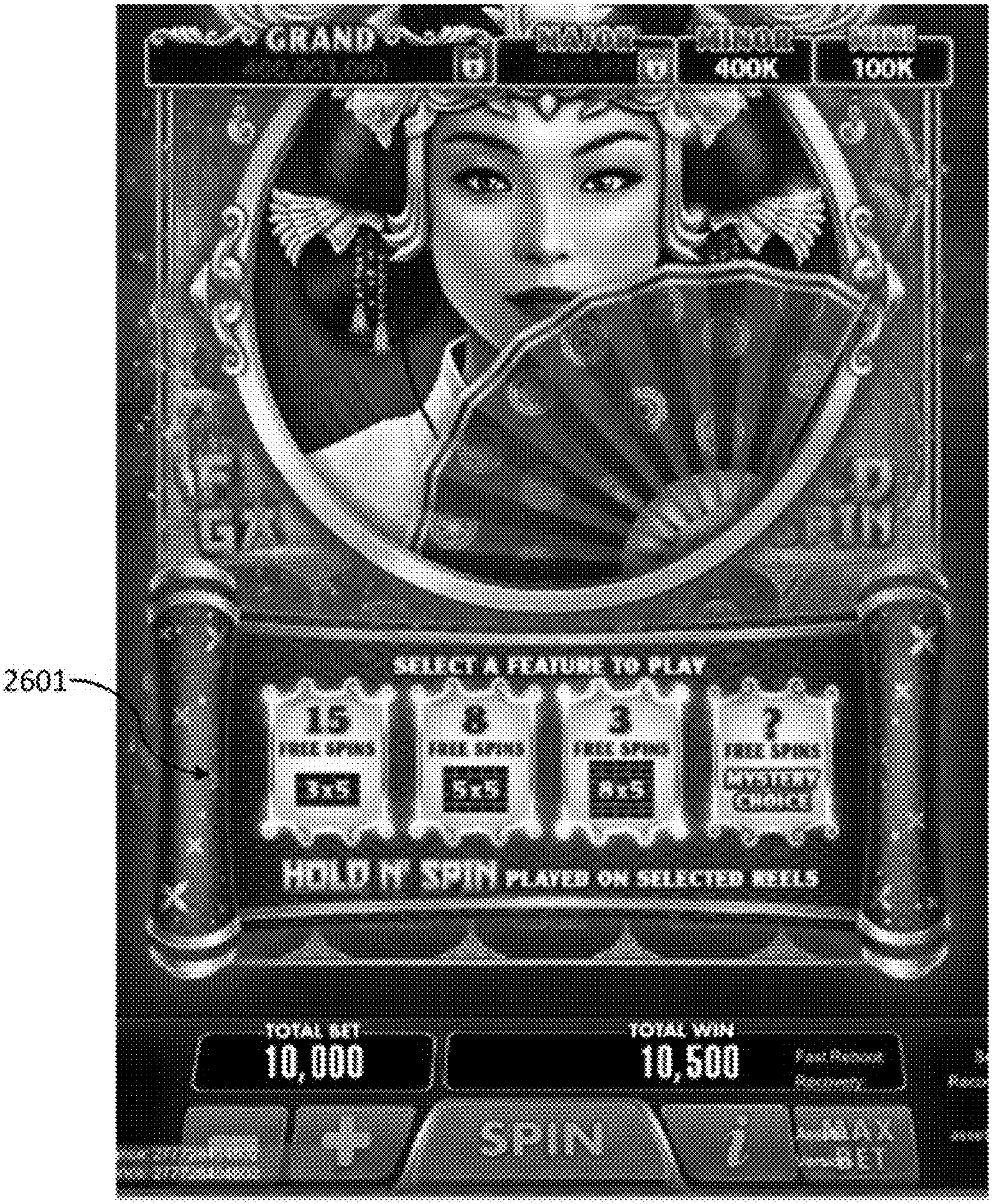

FIG. 26 is a screen display 2600 of a feature selection screen. In this example, the processor 249 controls the display to display four options 2601: 1. 15 free spins with 3 rows and 5 columns; 2. 8 free spins with 5 rows and 5 columns; 3. 3 free spins with 8 rows and 5 columns; and 4. A mystery choice involving a random selection of the number free spins and array size within the ranges of the other options.

Figure 27:
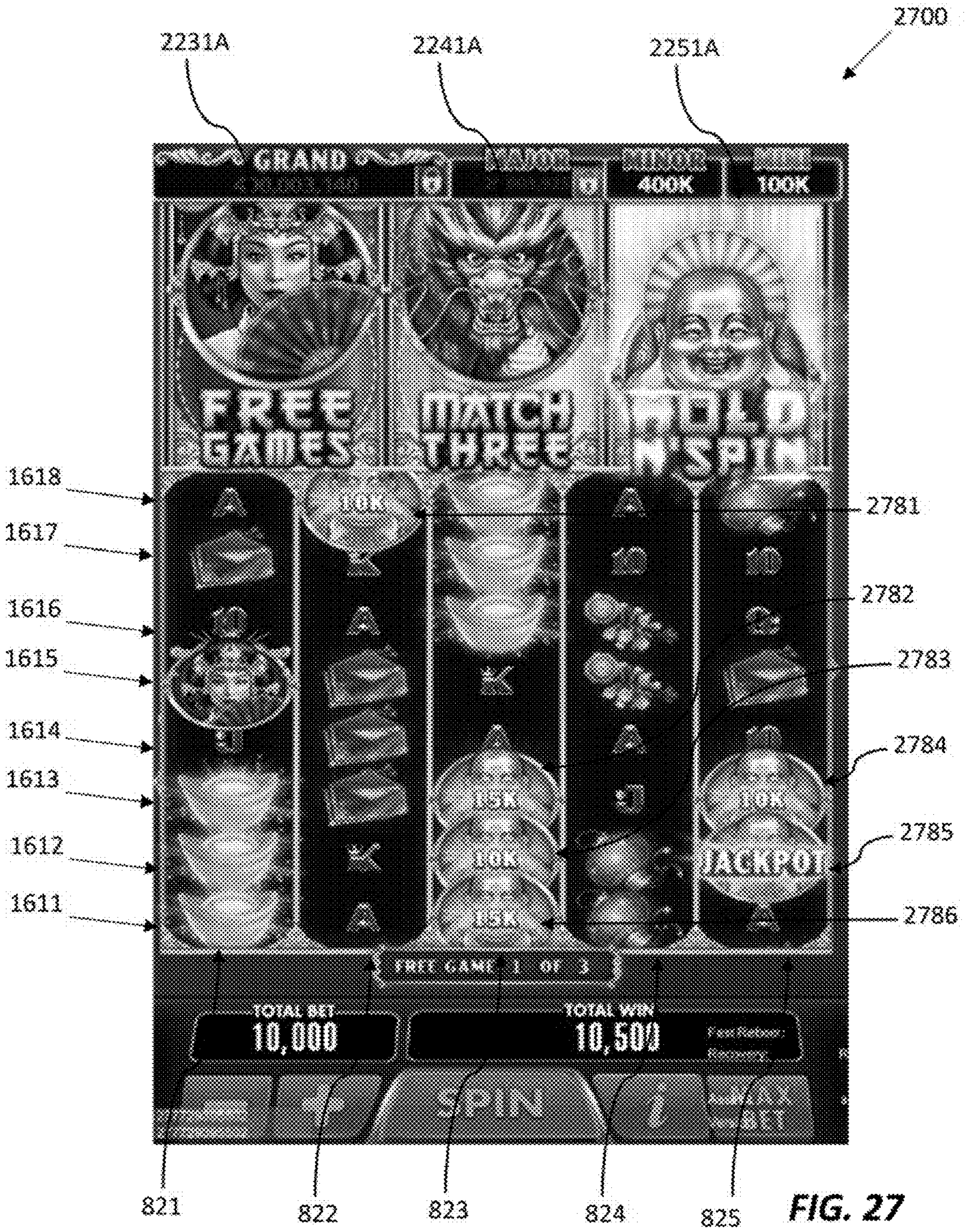

FIG. 27 is an example screen display 2700 during a game instance where the player has selected the third option so that the active array of symbol positions comprises eight rows 1611-1618 and five columns 821-825 of symbol positions. Processor 204 has controlled the display to incorporate modified feature indicators 2231A, 2241A, 2251A that have been reduced in size to accommodate the additional symbols positions. Screen display 2700 shows an example of a complete trigger for the "Hold N' Spin Feature" in the form of six prize value symbols 2781-2786 causing the processor 204 to initiate the hold and spin feature.

Figure 28:
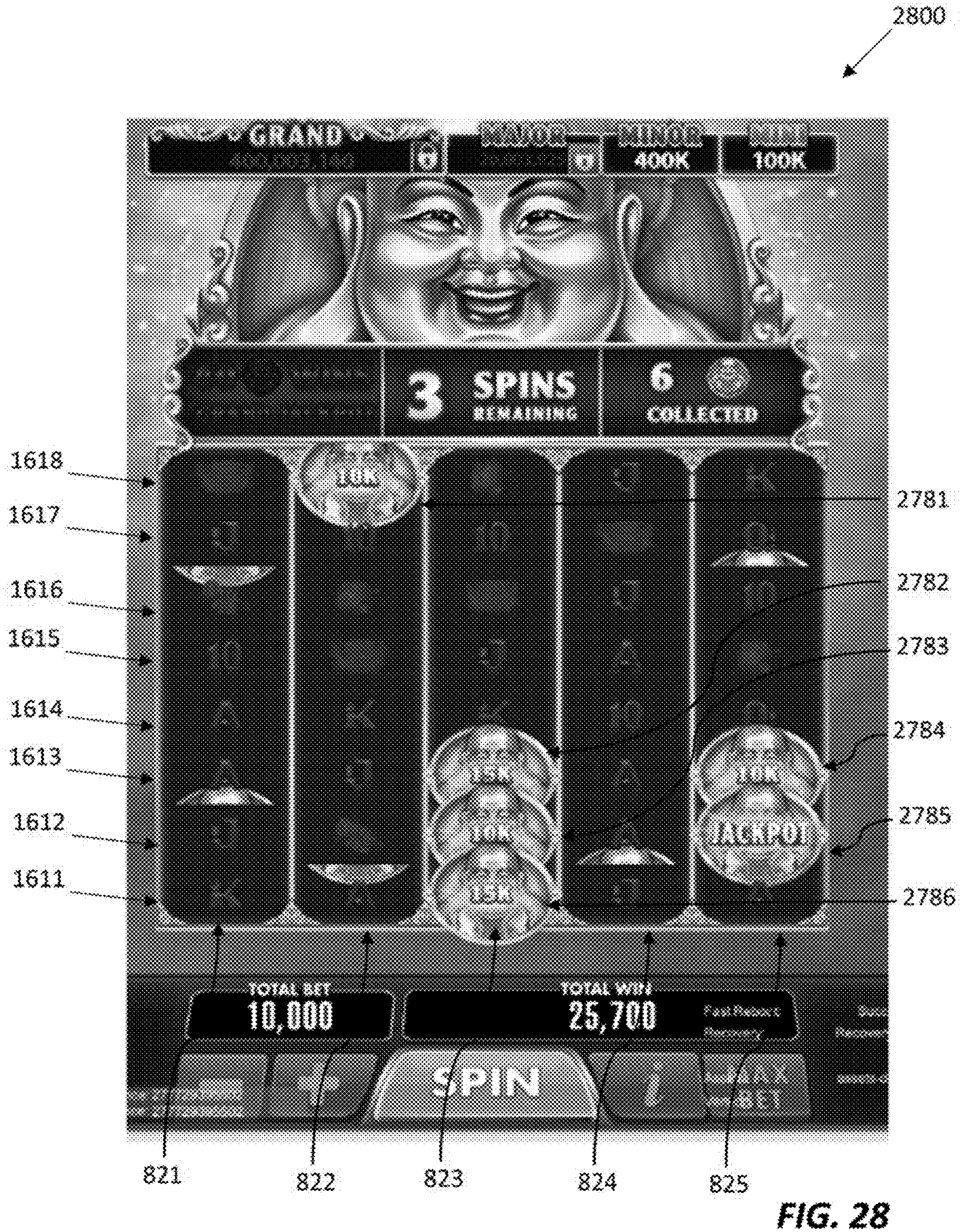

FIG. 28 is an example screen display 2800 where the processor 204 has controlled the display 240 to show the game state prior to commencement of the hold and spin feature with the six triggering prize value symbols 2781-2786 held in place.

Figure 29:

FIG. 29 is an example screen display at the conclusion of the game instances of the hold and spin feature triggered by the processor 204 from the screen display 2700. An advantage of the larger symbol array is that it provides more opportunities for prize value symbols to be accumulated. In this, example the result is that the processor 204 awards a win of "625K" or 625,000 credits at step 770.

Figure 30:

FIG. 30 is an example screen display 3000 following the processor 204 receiving a selection of the second option with five active rows 3011-3015 of symbol positions. FIG. 30 shows an example where selection of a single Princess symbol 3001 during a free game has resulted in the processor 204 determining at step 550 to trigger an additional free games feature. Processor 204 has controlled the display 240 to display a modified Princess icon 2232A at the final position of modified feature indicator 2231A and has added the number "1" 3041 to indicate the award of a further free games feature game.

Figure 31:

FIG. 31 is another screen display 3100 of a free game feature game for the same selected option as FIG. 30 in which a complete trigger in the form of prize value symbols 3181-3186 have been selected for display by processor 204.

Figure 32:

FIG. 32 is the resultant screen display 3200 when the hold and spin feature is initiated with the array being set to the same size by processor 204 as the size of the array when the feature was triggered with the triggering prize value symbols 3181-3186 held in place.

Figure 33:

FIG. 33 is an example screen display 3300 at the conclusion of the game instances of the hold and spin feature triggered by the processor 204 from the screen display 3100. In this, example the result of the hold and spin feature is that the processor 204 awards a win of "485K" or 485,000 credits at step 770.

Figure 34:

FIG. 34 is an example screen display 3000 following the processor 204 receiving a selection of the third option with three active rows 3411-3413 of symbol positions. FIG. 34 is an example in which a complete trigger in the form of prize value symbols 3581-3586 have been selected for display by processor 204.

Figure 35:

FIG. 35 is the resultant screen display 3500 when the hold and spin feature is initiated with the array being set to the same size (3 rows by five columns) by processor 204 as the size of the array when the feature was triggered with the triggering prize value symbols 3581-3586 held in place.

Figure 36:

FIG. 36 is an example screen display 3600 at the conclusion of the game instances of the hold and spin feature triggered by the processor 204 from the screen display 3300. In this, example the result of the hold and spin feature is that the processor 204 awards a win of "235K" or 235,000 credits at step 770.

In some embodiments, when a number of trigger symbols have been selected and displayed in a display array, such as, for example, the array of five columns 821-825 and three rows 811-813 of symbol positions of FIG. 8, a "touch to swap" feature may be initiated. In the "touch to swap" feature, a trigger symbol such as the Dragon symbol 962 of FIG. 9 and a corresponding feature icon such as the Dragon icon 942 of the second feature indicator 841 of FIG. 9, are replaced or swapped with a different trigger symbol and a corresponding different feature icon.

Figure 37:
Figure 38:
Figure 39:

FIGS. 37-42 illustrate a plurality of screen displays of initiating the "touch to swap" feature. Specifically, FIG. 37 illustrates an initial screen display 3700. The initial screen display 3700 shows a first feature indicator 3731, a second feature indicator 3741, and a third feature indicator 3751, which show a Princess icon 3732, a Dragon icon 3742, and a Buddha icon 3752, respectively. FIG. 38 illustrates an alternate screen display 3800. The alternate screen display 3800 shows the first feature indicator 3731 having a Prince icon 3733 that may swap with the Princess icon 3732, the second feature indicator 3741 having a Tiger icon 3743 that may swap with the Dragon icon 3742, and the third feature indicator 3751 having a Panda icon 3753 that may swap with the Buddha icon 3752, respectively. FIG. 39 shows a screen display 3900 wherein the array of five columns 821-825 and three rows 811-813 of symbol positions is displayed.

Figure 40:
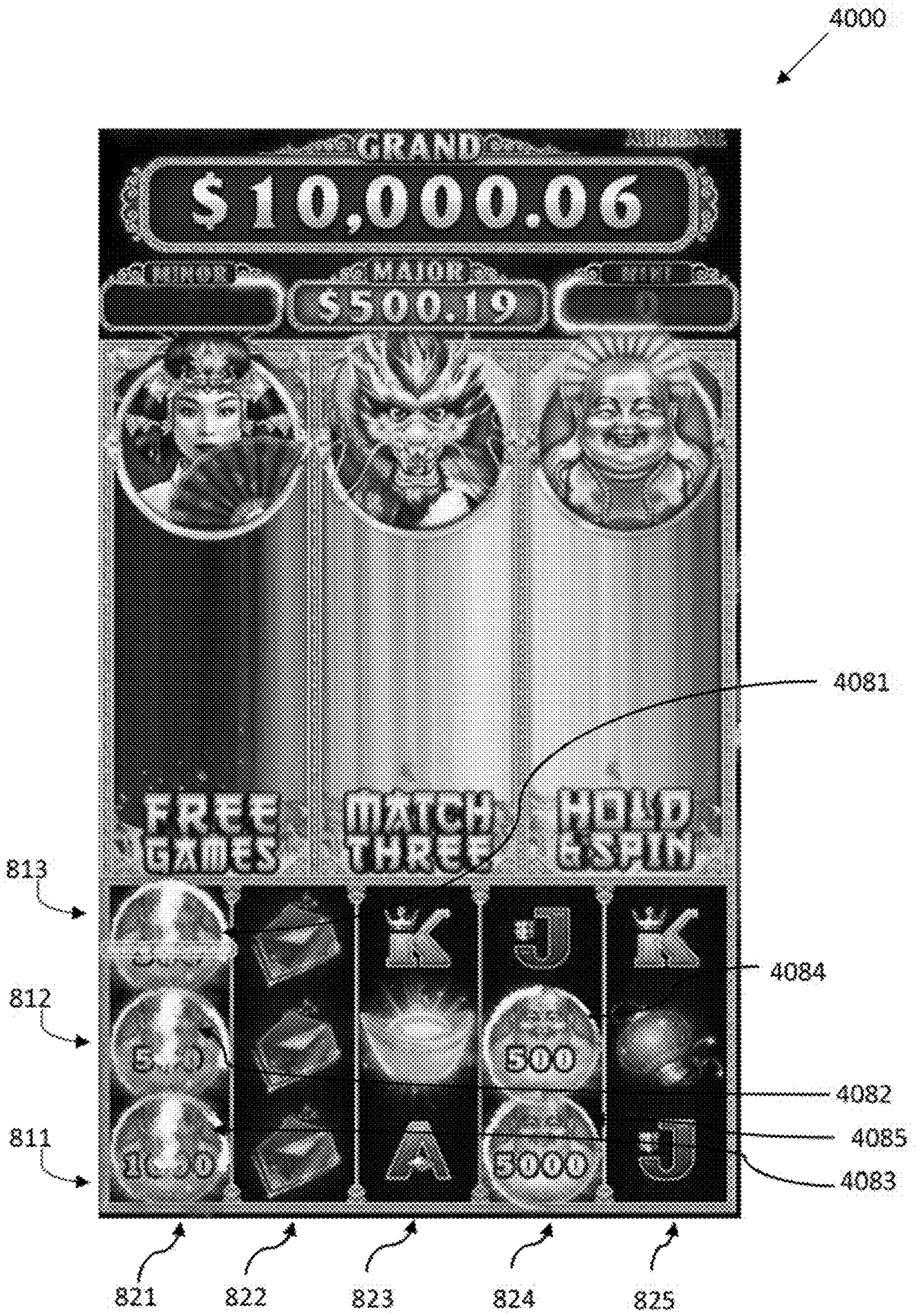

FIG. 40 shows an resultant screen display 4000 when the array of five columns 821-825 and three rows 811-813 of symbol positions displays a plurality of Buddha symbols 4081-4086. Specifically, the array of five columns 821-825 and three rows 811-813 of symbol positions displays five Buddha symbols 4081-4086. The plurality of Buddha symbols 4081-4086 are configured to show a plurality of values, respectively. For example, Buddha symbols 4081-4086 are configured to display corresponding values of 300, 500, 1000, 500, and 5000, respectively.

Figure 41:
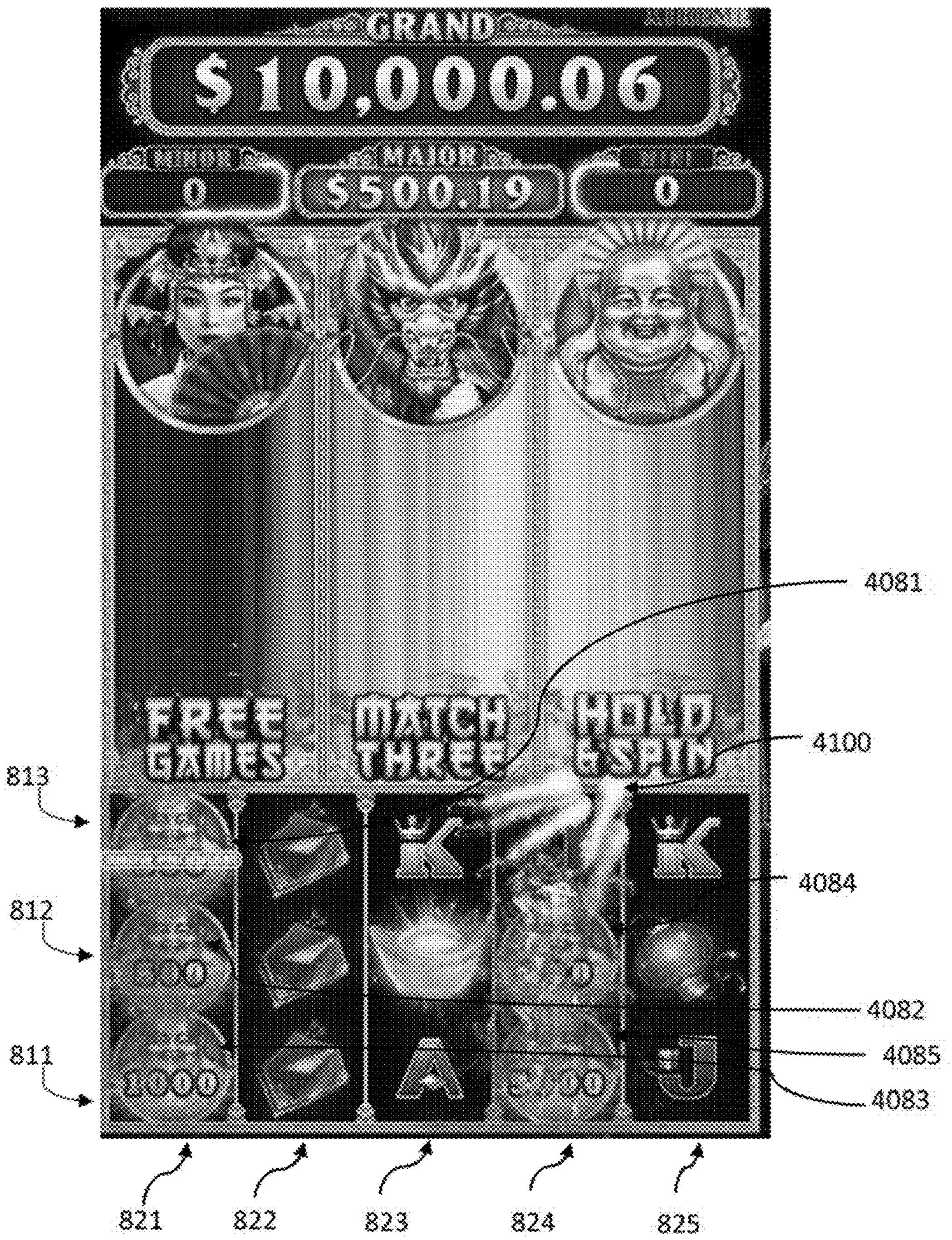
Figure 42:
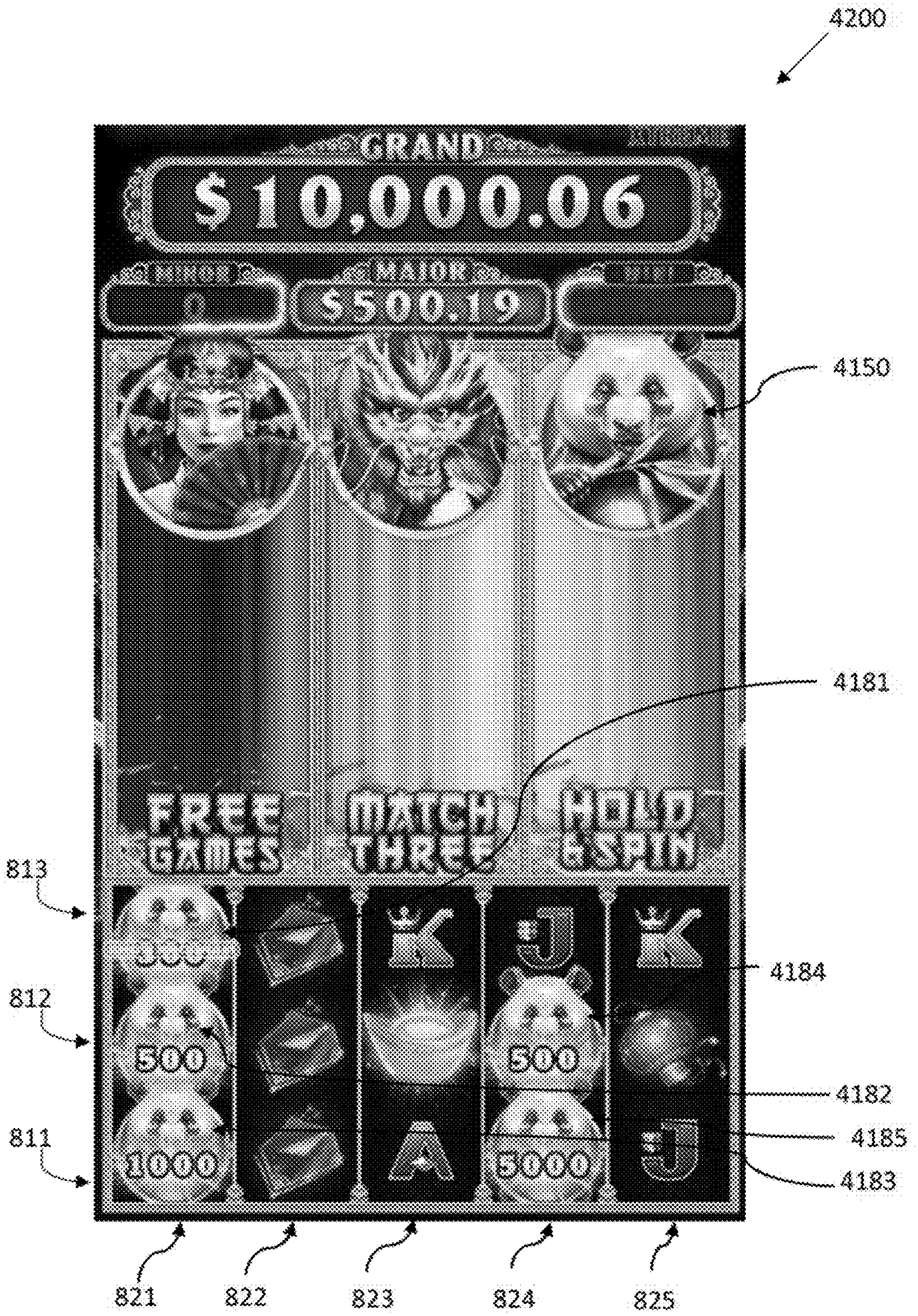

As shown in FIG. 41, and similar to FIG. 22, the plurality of Buddha symbols with the corresponding configured values also result in a bunch of animated sprites 4100 moving towards the third indicator 3751. The animated sprites 4100 share a visual characteristic of the Buddha symbol (in this example, a gold color) in order to communicate an association with the hold and spin feature. Further, as shown in FIG. 42, since the plurality of Buddha symbols 4081-4086 reach a predetermined number of five, the plurality of Buddha symbols 4081-4086 are also swamp with their alternative trigger symbols. As shown in FIG. 42, the plurality of Buddha symbols 4081-4086 (of FIG. 41) are replaced or swapped with a corresponding number (five) of Panda symbols 4181-4185. Similarly, the third feature indicator 3751 is correspondingly replaced or swapped with a corresponding feature icon, the Panda icon 3753. Although the embodiment shows that a number of five Buddha symbols triggers a replacement or swap of both trigger symbols and icons, other triggering events or numbers of trigger symbols may also be used. Further, although the embodiment shows the Buddha symbols are replaced or swapped, and the Buddha icon is replaced or swapped, other trigger symbols and feature icons may also be replaced or swapped. For example, when a predetermined or randomly generated number of Princess symbols are displayed in the array of five columns 821-825 and three rows 811-813 of symbol positions, the number of Princess symbols may be replaced or swapped with Prince symbols, and, correspondingly, the Princess icon 3732 may also be replaced or swapped with the Prince icon 3733. For another example, when a predetermined or randomly generated number of Dragon symbols are displayed in the array of five columns 821-825 and three rows 811-813 of symbol positions, the number of Dragon symbols may be replaced or swapped with Tiger symbols, and, correspondingly, the Dragon icon 3742 may also be replaced or swapped with the Tiger icon 3743.

While in the above example, the size of the array is fixed for each game instance of the free games feature, in other examples, the instructions are modified to so that when executed by the processor 204, the method of operating the gaming device comprises incorporating the dynamic array described above such that the size of the array can vary during each free game and the size of the array used for the hold and spin feature game depends on the size of the dynamic array in use in the free game from which the hold and spin feature was triggered.

Example Embodiments

An example embodiment provides a gaming device comprising: a display, a random number generator, a processor, and a memory storing (i) a set of reel strips comprising a plurality of symbols including trigger symbols, and (ii) instructions which, when executed by the processor, cause the processor to select a plurality of symbols from the set of reel strips using the random number generator, control the display to display the plurality of plurality of symbols at a respective ones of a plurality of symbol positions, control the display to display a feature indicator, the feature indicator comprising a feature icon corresponding to a feature game, wherein the feature indicator has a plurality of states, each state corresponding to a different position of the feature icon, upon the displayed symbols comprising at least one trigger symbol corresponding to the feature game, use the random number generator to randomly determine whether to change the state of the feature game indicator, and upon making a determination to change the state of the feature game, control the display to display the changed state of the feature game indicator.

In an example, the feature icon shares at least one visual characteristic with the trigger symbols associated with the feature game.

In an example, in at least one state other than a final state, the feature indicator includes an indication of a position to be occupied by the feature icon in a final state.

In an example, the indication of a position to be occupied by the feature icon in a final state comprises an outline of the position.

In an example, when the instructions are executed by the processor, they cause the processor to initiate the corresponding feature game when the respective feature icon reaches a final state.

Another example embodiment provides a method of operating a gaming device comprising a display, a random number generator, and memory storing a set of reel strips comprising a plurality of symbols including trigger symbols, the method comprising selecting a plurality of symbols from the set of reel strips using the random number generator, controlling the display to display the plurality of plurality of symbols at a respective ones of a plurality of symbol positions, controlling the display to display a feature indicator, the feature indicator comprising a feature icon corresponding to a feature game, wherein the feature indicator has a plurality of states, each state corresponding to a different position of the feature icon, and upon the displayed symbols comprising at least one trigger symbol corresponding to the feature game, using the random number generator to randomly determine whether to change the state of the feature game indicator, and upon making a determination to change the state of the feature game, controlling the display to display the changed state of the feature game indicator.

Another example embodiment provides a gaming system comprising at least one display, a random number generator, one or more processors, and a memory storing (i) a set of reel strips comprising a plurality of symbols including trigger symbols, and (ii) instructions which, when executed by the one or more processors, cause the one or more processors to select a plurality of symbols from the set of reel strips using the random number generator, control the display to display the plurality of plurality of symbols at a respective ones of a plurality of symbol positions, control the display to display a feature indicator, the feature indicator comprising a feature icon corresponding to a feature game, wherein the feature indicator has a plurality of states, each state corresponding to a different position of the feature icon, upon the displayed symbols comprising at least one trigger symbol corresponding to the feature game, use the random number generator to randomly determine whether to change the state of the feature game indicator, and upon making a determination to change the state of the feature game, control the display to display the changed state of the feature game indicator.

Another example embodiment provides a gaming device comprising a display, a random number generator, a processor, and a memory storing (i) a set of reel strips comprising a plurality of symbols including trigger symbols, and (ii) instructions which, when executed by the processor, cause the processor to select a plurality of symbols from the set of reel strips using the random number generator, control the display to display the plurality of plurality of symbols at a respective ones of a plurality of symbol positions, upon the selected symbols meeting a trigger condition for a free games feature game, initiate a free games feature game comprising a plurality of game instances in which symbols are selected using the random number generator and displayed on the display, upon a trigger condition being met for a hold and spin feature during a game instance of the free games feature, set an array size of symbol positions for the hold and spin feature game to a current array size of the free games feature, conduct the hold and spin feature game, and make any award resulting from the hold and spin feature game.

Another example embodiment provides a method of operating a gaming device comprising a display, a random number generator, and memory storing a set of reel strips comprising a plurality of symbols including trigger symbols, the method comprising selecting a plurality of symbols from the set of reel strips using the random number generator, controlling the display to display the plurality of plurality of symbols at a respective ones of a plurality of symbol positions, upon the selected symbols meeting a trigger condition for a free games feature game, initiating a free games feature game comprising a plurality of game instances in which symbols are selected using the random number generator and displayed on the display, upon a trigger condition being met for a hold and spin feature during a game instance of the free games feature, setting an array size of symbol positions for the hold and spin feature game to a current array size of the free games feature, conducting the hold and spin feature game, and making any award resulting from the hold and spin feature game.

Another example embodiment provides a gaming system comprising at least one display, a random number generator, one or more processors, and a memory storing (i) a set of reel strips comprising a plurality of symbols including trigger symbols, and (ii) instructions which, when executed by the one or more processors, cause the one or more processors to select a plurality of symbols from the set of reel strips using the random number generator, control the display to display the plurality of plurality of symbols at a respective ones of a plurality of symbol positions, upon the selected symbols meeting a trigger condition for a free games feature game, initiate a free games feature game comprising a plurality of game instances in which symbols are selected using the random number generator and displayed on the display, upon a trigger condition being met for a hold and spin feature during a game instance of the free games feature, setting an array size of symbol positions for the hold and spin feature game to a current array size of the free games feature, conduct the hold and spin feature game, and make any award resulting from the hold and spin feature game.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device operable to meet a designated triggering rate of a feature game, the electronic gaming device comprising:

a display having a plurality of symbol positions; and a controller comprising a processor and a memory storing (i) a plurality of reel strips comprising a set of symbols including a plurality of trigger symbols, (ii) data indicative of a threshold number, and (iii) instructions which, when executed, cause the processor to:

for a first game instance, control the plurality of symbol positions to display a plurality of symbols selected from the set of symbols for each of the reel strips based on a random number generated by a random number generator, responsive to the plurality of symbols in the first game instance including a number of trigger symbols having reached the threshold number, control the display to animate at least one triggered symbol displayed at a first symbol position being moved to a different symbol position of the plurality of symbol positions causing the feature game to initiate, the feature game comprising at least a second game instance, responsive to the plurality of symbols in the first game instance including a number of trigger symbols less than the threshold number, control the display to initiate the feature game randomly determined based on a second random number generated by the random number generator to meet the designated triggering rate of the feature game, control the display to animate the feature game initiated, and control the display to animate any award resulting from the feature game.

2. The electronic gaming device of claim 1, wherein the instructions which cause the processor to randomly determine whether to initiate the feature game using the random number generator, when executed, further cause the processor to determine whether to initiate the feature game by conducting a separate random determination for each of the number of trigger symbols using the random number generator.

3. The electronic gaming device of claim 1, wherein the feature game is a hold-and-spin feature game in which the trigger symbols are held from the first game instance to the second game instance and each subsequent game instance of the feature game, and wherein the instructions, when executed, further cause the processor to, upon the feature game being initiated in response to a random determination, add additional trigger symbols to one or more of the plurality of symbol positions so that the second game instance begins with the number of trigger symbols.

4. The electronic gaming device of claim 3, wherein the trigger symbols comprise prize value symbols.

5. The electronic gaming device of claim 3, wherein the trigger symbols comprise a plurality of configurable symbols, and wherein the instructions, when executed, further cause the processor to assign prize values to at least any of the plurality of configurable symbols selected for display in a respective game instance.

6. The electronic gaming device of claim 1, wherein the feature game comprises a series of game instances including the second game instance and wherein the instructions, when executed, further cause the processor to make a new selection of symbols for all of the symbol positions in at least the second game instance.

7. The electronic gaming device of claim 1, wherein there are a plurality of feature games and the trigger symbols include symbols having different visual characteristics corresponding to respective ones of the plurality of feature games.

8. An electronic gaming system operable to meet a designated triggering rate of a feature game, the electronic gaming system comprising:

at least one display having a plurality of symbol positions; and a server having one or more processors, and at least one memory storing (i) a plurality of reel strips comprising a set of symbols including a plurality of trigger symbols, (ii) data indicative of a threshold number, and (iii) instructions which, when executed, cause the one or more processors to:

for a first game instance, control the plurality of symbol positions to display a plurality of symbols selected from the set of symbols for each of the reel strips based on a random number generated by a random number generator, responsive to the plurality of symbols in the first game instance including a number of trigger symbols having reached the threshold number, control the display to animate at least one triggered symbol displayed at a first symbol position being moved to a different symbol position of the plurality of symbol positions causing the feature game to initiate, the feature game comprising at least a second game instance, responsive to the plurality of symbols in the first game instance including a number of trigger symbols less than the threshold number, control the display to initiate the feature game randomly determined based on a second random number generated by the random number generator to meet the designated triggering rate of the feature game, control the display to animate the feature game initiated, and control the display to animate any award resulting from the feature game.

9. The electronic gaming system of claim 8, wherein different threshold numbers apply for at least two feature games.

10. The electronic gaming system of claim 8, wherein the instructions, when executed, further cause the one or more processors to control the plurality of symbol positions to display a plurality of feature indicators, each feature indicator comprising a feature icon corresponding to a respective feature game.

11. The electronic gaming system of claim 10, wherein each of the feature indicators has a plurality of states, each state comprising a different position of the feature icon respectively.

12. The electronic gaming system of claim 10, wherein in at least one state other than a final state, each of the feature indicators includes an indication of a respective symbol position to be occupied by the feature icon in the final state.

13. The electronic gaming system of claim 10, wherein the instructions, when executed by the one or more processors, further cause the one or more processors to initiate a corresponding feature game when the feature icon reaches a final state.

14. A non-transitory computer-readable medium for operating a gaming device to meet a designated triggering rate of a feature game, the gaming device comprising a display having a plurality of symbol positions, a server comprising a game controller having a processor and a memory storing a set of reel strips comprising a set of symbols including a plurality of trigger symbols, data indicative of a threshold number, and instructions, which, when executed, cause the processor to perform the steps of:

for a first game instance, controlling the plurality of symbol positions to display a plurality of symbols selected from the set of symbols for each reel strip based on a random number generated by a random number generator;

responsive to the plurality of symbols in the first game instance including a number of trigger symbols having reached the threshold number, controlling the display to animate at least one triggered symbol displayed at a first symbol positions being moved to a different symbol position of the plurality of symbol positions causing the feature game to initiate, the feature game comprising at least a second game instance;

responsive to the plurality of symbols in the first game instance including a number of trigger symbols less than the threshold number, controlling the display to initiate the feature game randomly determined based on a second random number generated by the random number generator to meet the designated triggering rate of the feature game;

controlling the display to animate the feature game initiated; and controlling the display to animate any award resulting from the feature game.

15. The non-transitory computer-readable medium of claim 14, wherein the instructions, when executed, further cause the processor to perform the step of determining in at least each game instance where at least one of the trigger symbols is selected, whether to change a state of a corresponding feature icon.

16. The non-transitory computer-readable medium of claim 15, wherein the instructions, when executed, further cause the processor to perform the step of determining in at least each game instance where at least one of the trigger symbols is selected, whether to increase a counter associated with the state of the corresponding feature icon and to change the state of the corresponding feature icon upon the counter reaching a value associated with the state respectively.

17. The non-transitory computer-readable medium of claim 15, wherein the instructions, when executed, further cause the processor to perform the steps of, for at least one of the feature game:

selecting an additional plurality of symbols for a plurality of additional symbol positions than in the first game instance during at least some second game instances, the plurality of additional symbol positions occupying more display area on the display than the plurality of symbol positions of the first game instances; and adjusting a size of the display of a plurality of feature indicators to accommodate the additional symbol positions.

18. The non-transitory computer-readable medium of claim 15, wherein the instructions, when executed, further cause the processor to perform the step of:

selecting, using the random number generator, an array size of symbol positions for each game instance from a plurality of different array sizes comprising different numbers of symbol positions; and selecting an additional symbol for each of the symbol positions in each of the game instances.

19. The non-transitory computer-readable medium of claim 17, wherein the instructions, when executed, cause the processor to perform the step of determining whether to initiate a hold-and-spin feature game based on the symbols selected in each game instance of a series of game instances, and upon the hold-and-spin feature game being triggered, initiate the hold-and-spin feature game with an array a size equaling that used in the game instance from which the hold-and-spin feature game was triggered.

20. The non-transitory computer-readable medium of claim 17, wherein, when least one game instance of a hold-and-spin feature game is initiated, the instructions, when executed, further cause the processor to perform the step of associating an individual reel strip with each individual symbol position not occupied by a held symbol such that a number of reel strips used in game instances of the hold-and-spin feature game are dependent on an array size and a number of held symbols.

* * * * *